(12) United States Patent
Ohkawa et al.

(10) Patent No.: US 9,565,119 B2
(45) Date of Patent: Feb. 7, 2017

(54) PACKET ANALYSIS METHOD, PACKET ANALYSIS DEVICE, AND STORAGE MEDIUM

(71) Applicant: FUJITSU LIMITED, Kawasaki-shi, Kanagawa (JP)

(72) Inventors: Naoyoshi Ohkawa, Kawasaki (JP); Yuji Nomura, Kawasaki (JP); Sumiyo Okada, Kawasaki (JP); Fumiyuki Iizuka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 139 days.

(21) Appl. No.: 14/339,993

(22) Filed: Jul. 24, 2014

(65) Prior Publication Data

US 2015/0043351 A1 Feb. 12, 2015

(30) Foreign Application Priority Data

Aug. 8, 2013 (JP) .................................. 2013-165410

(51) Int. Cl.
*H04L 12/841* (2013.01)
*H04L 12/26* (2006.01)
*H04L 29/06* (2006.01)

(52) U.S. Cl.
CPC ............. *H04L 47/28* (2013.01); *H04L 43/026* (2013.01); *H04L 43/028* (2013.01); *H04L 43/04* (2013.01); *H04L 43/0888* (2013.01); *H04L 43/18* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 8,437,264 | B1* | 5/2013 | Go | H04L 43/16 370/251 |
| 2009/0116402 | A1* | 5/2009 | Yamasaki | H04L 43/024 370/253 |
| 2014/0330977 | A1* | 11/2014 | van Bemmel | H04L 69/22 709/226 |

FOREIGN PATENT DOCUMENTS

| JP | 2003-258881 | 9/2003 |
|---|---|---|
| JP | 2012-191440 | 10/2012 |

\* cited by examiner

*Primary Examiner* — Derrick Ferris
*Assistant Examiner* — Jay Vogel
(74) *Attorney, Agent, or Firm* — Staas & Halsey LLP

(57) ABSTRACT

A packet analysis method includes acquiring a first acknowledge packet and a second acknowledge packet transmitted from the first device; acquiring a plurality of packets transmitted from the second device during a period from reception of the first acknowledge packet to reception of the second acknowledge packet; identifying a number of packets corresponds to data transmitted from the second device, by calculating a difference between a first identification number corresponding to the first acknowledge packet and a second identification number corresponding to the second acknowledge packet; calculating a plurality of bandwidth values, a number of the plurality of bandwidth values is identical to the number of packets, based on acquisition timings of the plurality of packets and an interval between the acquisition timings of two adjacent packets; and determining a bandwidth value that is to be removed from the plurality of bandwidth values by comparing the plurality of bandwidth values.

19 Claims, 42 Drawing Sheets

FIG. 3

| Conn.ID | Src.IP | Src.Port | Dst.IP | Dst.Port |
|---|---|---|---|---|
| 0 | 10.25.100.100 | 80 | 10.25.200.100 | 200 |
| 1 | 10.25.101.100 | 443 | 10.25.200.100 | 400 |
| 2 | 10.25.300.100 | 20 | 10.25.400.100 | 600 |
| 3 | ... | ... | ... | ... |
| ... | ... | ... | ... | ... |

FIG. 6

| Conn.ID | Data.ID | Seq | Len | Time |
|---|---|---|---|---|
| 0 | 0 | 1500 | 1500 | 1000 |
| 0 | 1 | 3000 | 1500 | 1120 |
| 0 | 2 | 4500 | 1500 | 1240 |
| 0 | 3 | 6000 | 1500 | 1360 |

| Conn.ID | Data.ID | Seq | Len | Time |
|---|---|---|---|---|
| 1 | 0 | ... | ... | ... |
| 1 | 1 | ... | ... | ... |
| 1 | 2 | ... | ... | ... |
| 1 | 3 | ... | ... | ... |
| ... | ... | ... | ... | ... |

FIG. 7

| Conn.ID | Ack.ID | Ack | Time | Data.ID |
|---|---|---|---|---|
| 0 | 0 | 3000 | 3000 | 0 |
| 0 | 1 | 6000 | 3240 | 2 |
| ... | ... | ... | ... | ... |

| Conn.ID | Ack.ID | Ack | Time | Data.ID |
|---|---|---|---|---|
| 1 | 0 | ... | ... | ... |
| 1 | 1 | ... | ... | ... |
| ... | ... | ... | ... | ... |

FIG. 8

| Conn.ID | Size | Time.Gap |
|---|---|---|
| 0 | 3000 | 240 |
| 1 | 1500 | 240 |
| 2 | 4500 | 240 |
| 3 | ... | ... |
| ... | ... | ... |

| S103 | | | | | 113 | |
|---|---|---|---|---|---|---|
| | ~113b | | | | ~113f | |
| Conn.ID | Status | Start.ID | Num.Stream | Ex.RWIN | Now.Data.ID | Now.Ack.ID |
| 0 | INIT | | | 65700 | 1 | 0 |
| ... | ... | ... | ... | ... | ... | ... |

| Conn.ID | BW.ID | Size | Time.Gap | |
|---|---|---|---|---|
| ... | ... | ... | ... | ~114 |

| | | ~115b | ~115c | ~115d | ~115e | |
|---|---|---|---|---|---|---|
| Conn.ID | Data.ID | Seq | Len | Time | | 115 |
| 0 | 0 | 1 | 1500 | 100 | | |
| 0 | 1 | 1501 | 1500 | 500 | | |
| ... | ... | ... | ... | ... | | |

| Conn.ID | Ack.ID | Ack | Time | Data.ID | 116 |
|---|---|---|---|---|---|
| 0 | 0 | 1501 | 300 | 0 | |
| ... | ... | ... | ... | ... | |

FIG. 14E

| S105 | | | 113 | | | |
|---|---|---|---|---|---|---|
| | | | ↓ ~113d | | | |
| Conn.ID | Status | Start.ID | Num.Stream | Ex.RWIN | Now.Data.ID | Now.Ack.ID |
| 0 | INIT | | 2 | 65700 | 2 | 1 |
| ... | ... | ... | ... | ... | ... | ... |

| Conn.ID | BW.ID | Size | Time.Gap | |
|---|---|---|---|---|
| 0 | 0 | 0 | 0 | ~114 |
| 0 | 1 | 0 | 0 | |

| Conn.ID | Data.ID | Seq | Len | Time | |
|---|---|---|---|---|---|
| 0 | 0 | 1 | 1500 | 100 | ~115 |
| 0 | 1 | 1501 | 1500 | 500 | |
| 0 | 2 | 3001 | 1500 | 600 | |
| ... | ... | ... | ... | ... | |

| Conn.ID | Ack.ID ~116b | Ack ~116c | Time ~116d | Data.ID ~116e | |
|---|---|---|---|---|---|
| 0 | 0 | 1501 | 300 | 0 | ~116 |
| 0 | 1 | 4501 | 800 | 2 | |
| ... | ... | ... | ... | ... | |

FIG. 15A

| S106 | | | 113 | | | |
|---|---|---|---|---|---|---|
| Conn.ID | Status (113b) | Start.ID | Num.Stream | Ex.RWIN | Now.Data.ID (113f) | Now.Ack.ID |
| 0 | INIT | | 2 | 65700 | 3 | 1 |
| ... | ... | ... | ... | ... | ... | ... |

| Conn.ID | BW.ID | Size | Time.Gap | 114 |
|---|---|---|---|---|
| ... | ... | ... | ... | |

| Conn.ID | Data.ID (115b) | Seq (115c) | Len (115d) | Time (115e) | 115 |
|---|---|---|---|---|---|
| 0 | 0 | 1 | 1500 | 100 | |
| 0 | 1 | 1501 | 1500 | 500 | |
| 0 | 2 | 3001 | 1500 | 600 | |
| 0 | 3 | 4501 | 1500 | 1000 | |
| ... | ... | ... | ... | ... | |

| Conn.ID | Ack.ID | Ack | Time | Data.ID | 116 |
|---|---|---|---|---|---|
| 0 | 0 | 1501 | 300 | 0 | |
| 0 | 1 | 4501 | 800 | 2 | |
| ... | ... | ... | ... | ... | |

| Conn.ID | Status | Start.ID | Num.Stream | Ex.RWIN | Now.Data.ID | Now.Ack.ID |
|---|---|---|---|---|---|---|
| 0 | INIT | | 2 | 65700 | 4 | 1 |
| ... | ... | ... | ... | ... | ... | ... |

113b ... 113f

| Conn.ID | BW.ID | Size | Time.Gap |
|---|---|---|---|
| ... | ... | ... | ... |

114

| Conn.ID | Data.ID | Seq | Len | Time |
|---|---|---|---|---|
| 0 | 0 | 1 | 1500 | 100 |
| 0 | 1 | 1501 | 1500 | 500 |
| 0 | 2 | 3001 | 1500 | 600 |
| 0 | 3 | 4501 | 1500 | 1000 |
| 0 | 4 | 6001 | 1500 | 1100 |
| ... | ... | ... | ... | ... |

115 (115b, 115c, 115d, 115e)

| Conn.ID | Ack.ID | Ack | Time | Data.ID |
|---|---|---|---|---|
| 0 | 0 | 1501 | 300 | 0 |
| 0 | 1 | 4501 | 800 | 2 |
| ... | ... | ... | ... | ... |

116

| S108 | | | 113 | | | |
|---|---|---|---|---|---|---|
| Conn.ID | Status 113b | Start.ID | Num.Stream | Ex.RWIN | Now.Data.ID | Now.Ack.ID |
| 0 | SET_ID | | 2 | 65700 | 4 | 2 |
| ... | ... | ... | ... | ... | ... | ... |

| Conn.ID | BW.ID | Size | Time.Gap | 114 |
|---|---|---|---|---|
| 0 | 0 | 0 | 0 | |
| 0 | 1 | 0 | 0 | |

| Conn.ID | Data.ID | Seq | Len | Time | 115 |
|---|---|---|---|---|---|
| 0 | 0 | 1 | 1500 | 100 | |
| 0 | 1 | 1501 | 1500 | 500 | |
| 0 | 2 | 3001 | 1500 | 600 | |
| 0 | 3 | 4501 | 1500 | 1000 | |
| 0 | 4 | 6001 | 1500 | 1100 | |
| ... | ... | ... | ... | ... | |

| Conn.ID | Ack.ID 116b | Ack 116c | Time 116d | Data.ID 116e | 116 |
|---|---|---|---|---|---|
| 0 | 0 | 1501 | 300 | 0 | |
| 0 | 1 | 4501 | 800 | 2 | |
| 0 | 2 | 7501 | 1300 | 4 | |
| ... | ... | ... | ... | ... | |

| S109 | | | 113 | | | |
|---|---|---|---|---|---|---|
| Conn.ID | Status | Start.ID (113b) | Num.Stream (113c) | Ex.RWIN | Now.Data.ID (113f) | Now.Ack.ID |
| 0 | SET_ID | 5 | 2 | 65700 | 5 | 2 |
| ... | ... | ... | ... | ... | ... | ... |

| Conn.ID | BW.ID | Size | Time.Gap | 114 |
|---|---|---|---|---|
| 0 | 0 | 0 | 0 | |
| 0 | 1 | 0 | 0 | |

| Conn.ID | Data.ID (115b) | Seq (115c) | Len (115d) | Time (115e) | 115 |
|---|---|---|---|---|---|
| 0 | 0 | 1 | 1500 | 100 | |
| 0 | 1 | 1501 | 1500 | 500 | |
| 0 | 2 | 3001 | 1500 | 600 | |
| 0 | 3 | 4501 | 1500 | 1000 | |
| 0 | 4 | 6001 | 1500 | 1100 | |
| 0 | 5 | 7501 | 1500 | 1500 | |
| ... | ... | ... | ... | ... | |

| Conn.ID | Ack.ID | Ack | Time | Data.ID | 116 |
|---|---|---|---|---|---|
| 0 | 0 | 1501 | 300 | 0 | |
| 0 | 1 | 4501 | 800 | 2 | |
| 0 | 2 | 7501 | 1300 | 4 | |
| ... | ... | ... | ... | ... | |

FIG. 15E

| S110 | | | 113 | | | |
|---|---|---|---|---|---|---|
| Conn.ID | Status | Start.ID | Num.Stream | Ex.RWIN | Now.Data.ID | Now.Ack.ID |
| 0 | SET_ID | 5 | 2 | 65700 | 6 | 2 |
| ... | ... | ... | ... | ... | ... | ... |

| Conn.ID | BW.ID | Size | Time.Gap | 114 |
|---|---|---|---|---|
| 0 | 0 | 0 | 0 | |
| 0 | 1 | 0 | 0 | |

| Conn.ID | Data.ID | Seq | Len | Time | 115 |
|---|---|---|---|---|---|
| | 115b | 115c | 115d | 115e | |
| 0 | 0 | 1 | 1500 | 100 | |
| 0 | 1 | 1501 | 1500 | 500 | |
| 0 | 2 | 3001 | 1500 | 600 | |
| 0 | 3 | 4501 | 1500 | 1000 | |
| 0 | 4 | 6001 | 1500 | 1100 | |
| 0 | 5 | 7501 | 1500 | 1500 | |
| 0 | 6 | 9001 | 1500 | 1600 | |
| ... | ... | ... | ... | ... | |

| Conn.ID | Ack.ID | Ack | Time | Data.ID | 116 |
|---|---|---|---|---|---|
| 0 | 0 | 1501 | 300 | 0 | |
| 0 | 1 | 4501 | 800 | 2 | |
| 0 | 2 | 7501 | 1300 | 4 | |
| ... | ... | ... | ... | ... | |

| Conn.ID | Status | Start.ID | Num.Stream | Ex.RWIN | Now.Data.ID | Now.Ack.ID |
|---|---|---|---|---|---|---|
| 0 | MEASURE | 5 | 2 | 65700 | 7 | 3 |
| ... | ... | ... | ... | ... | ... | ... |

113

| Conn.ID | BW.ID | Size | Time.Gap |
|---|---|---|---|
| 0 | 0 | 1500 | 100 |
| 0 | 1 | 1500 | 400 |
| ... | ... | ... | ... |

114

| Conn.ID | Data.ID | Seq | Len | Time |
|---|---|---|---|---|
| ... | ... | ... | ... | ... |
| 0 | 5 | 7501 | 1500 | 1500 |
| 0 | 6 | 9001 | 1500 | 1600 |
| 0 | 7 | 10501 | 1500 | 2000 |
| ... | ... | ... | ... | ... |

115

| Conn.ID | Ack.ID | Ack | Time | Data.ID |
|---|---|---|---|---|
| ... | ... | ... | ... | ... |
| 0 | 2 | 7501 | 1300 | 4 |
| 0 | 3 | 10501 | 1800 | 6 |
| ... | ... | ... | ... | ... |

116

| Conn.ID | Size | Time.Gap |
|---|---|---|
| ... | ... | ... |

| S113 | | | | 113 | | |
|---|---|---|---|---|---|---|
| Conn.ID | Status | Start.ID | Num.Stream | Ex.RWIN | Now.Data.ID | Now.Ack.ID |
| 0 | MEASURE | 5 | 2 | 65700 | 8 | 3 |
| ... | ... | ... | ... | ... | ... | ... |

| Conn.ID | BW.ID | Size (114c) | Time.Gap (114d) | 114 |
|---|---|---|---|---|
| 0 | 0 | 1500 | 100 | |
| 0 | 1 | 1500 | 400 | |
| ... | ... | ... | ... | |

| Conn.ID | Data.ID | Seq | Len | Time | 115 |
|---|---|---|---|---|---|
| ... | ... | ... | ... | ... | |
| 0 | 6 | 9001 | 1500 | 1600 | |
| 0 | 7 | 10501 | 1500 | 2000 | |
| 0 | 8 | 12001 | 1500 | 2100 | |
| ... | ... | ... | ... | ... | |

| Conn.ID | Ack.ID | Ack | Time | Data.ID | 116 |
|---|---|---|---|---|---|
| ... | ... | ... | ... | ... | |
| 0 | 2 | 7501 | 1300 | 4 | |
| 0 | 3 | 10501 | 1800 | 6 | |
| ... | ... | ... | ... | ... | |

| Conn.ID | Size | Time.Gap | 117 |
|---|---|---|---|
| ... | ... | ... | |

| S114 | | | | 113 | | |
|---|---|---|---|---|---|---|
| Conn.ID | Status | Start.ID | Num.Stream | Ex.RWIN | Now.Data.ID | Now.Ack.ID |
| 0 | MEASURE | 5 | 2 | 65700 | 8 | 4 |
| ... | ... | ... | ... | ... | ... | ... |

114c, 114d

| Conn.ID | BW.ID | Size | Time.Gap | 114 |
|---|---|---|---|---|
| 0 | 0 | 3000 | 200 | |
| 0 | 1 | 3000 | 800 | |
| ... | ... | ... | ... | |

| Conn.ID | Data.ID | Seq | Len | Time | 115 |
|---|---|---|---|---|---|
| ... | ... | ... | ... | ... | |
| 0 | 6 | 9001 | 1500 | 1600 | |
| 0 | 7 | 10501 | 1500 | 2000 | |
| 0 | 8 | 12001 | 1500 | 2100 | |
| ... | ... | ... | ... | ... | |

| Conn.ID | Ack.ID | Ack | Time | Data.ID | 116 |
|---|---|---|---|---|---|
| ... | ... | ... | ... | ... | |
| 0 | 3 | 10501 | 1800 | 6 | |
| 0 | 4 | 13501 | 2300 | 8 | |
| ... | ... | ... | ... | ... | |

| Conn.ID | Size | Time.Gap | 117 |
|---|---|---|---|
| ... | ... | ... | |

| S115 | | | 113 | | | |
|---|---|---|---|---|---|---|
| Conn.ID | Status | Start.ID | Num.Stream | Ex.RWIN | Now.Data.ID | Now.Ack.ID |
| 0 | MEASURE | 5 | 2 | 65700 | 9 | 4 |
| ... | ... | ... | ... | ... | ... | ... |

| Conn.ID | BW.ID | Size | Time.Gap | 114 |
|---|---|---|---|---|
| 0 | 0 | 3000 | 200 | |
| 0 | 1 | 3000 | 800 | |
| ... | ... | ... | ... | |

| Conn.ID | Data.ID | Seq | Len | Time | 115 |
|---|---|---|---|---|---|
| ... | ... | ... | ... | ... | |
| 0 | 7 | 10501 | 1500 | 2000 | |
| 0 | 8 | 12001 | 1500 | 2100 | |
| 0 | 9 | 13501 | 1500 | 2500 | |
| ... | ... | ... | ... | ... | |

| Conn.ID | Ack.ID | Ack | Time | Data.ID | 116 |
|---|---|---|---|---|---|
| ... | ... | ... | ... | ... | |
| 0 | 3 | 10501 | 1800 | 6 | |
| 0 | 4 | 13501 | 2300 | 8 | |
| ... | ... | ... | ... | ... | |

| Conn.ID | Size | Time.Gap | 117 |
|---|---|---|---|
| ... | ... | ... | |

FIG. 16E

| S116 | | | | 113 | | |
|---|---|---|---|---|---|---|
| Conn.ID | Status | Start.ID | Num.Stream | Ex.RWIN | Now.Data.ID | Now.Ack.ID |
| 0 | MEASURE | 5 | 2 | 65700 | 10 | 4 |
| ... | ... | ... | ... | ... | ... | ... |

| Conn.ID | BW.ID | Size | Time.Gap | 114 |
|---|---|---|---|---|
| 0 | 0 | 3000 | 200 | |
| 0 | 1 | 3000 | 800 | |
| ... | ... | ... | ... | |

| Conn.ID | Data.ID | Seq | Len | Time | 115 |
|---|---|---|---|---|---|
| ... | ... | ... | ... | ... | |
| 0 | 8 | 12001 | 1500 | 2100 | |
| 0 | 9 | 13501 | 1500 | 2500 | |
| 0 | 10 | 15001 | 1500 | 2600 | |
| ... | ... | ... | ... | ... | |

| Conn.ID | Ack.ID | Ack | Time | Data.ID | 116 |
|---|---|---|---|---|---|
| ... | ... | ... | ... | ... | |
| 0 | 3 | 10501 | 1800 | 6 | |
| 0 | 4 | 13501 | 2300 | 8 | |
| ... | ... | ... | ... | ... | |

| Conn.ID | Size | Time.Gap | 117 |
|---|---|---|---|
| ... | ... | ... | |

FIG. 16F

| S117 | | | 113 | | | |
|---|---|---|---|---|---|---|
| Conn.ID | Status | Start.ID | Num.Stream | Ex.RWIN | Now.Data.ID | Now.Ack.ID |
| 0 | INIT | | | 65700 | 10 | 0 |
| ... | ... | ... | ... | ... | ... | ... |

| Conn.ID | BW.ID | Size | Time.Gap | 114 |
|---|---|---|---|---|
| ... | ... | ... | ... | |

| Conn.ID | Data.ID | Seq | Len | Time | 115 |
|---|---|---|---|---|---|
| ... | ... | ... | ... | ... | |
| 0 | 8 | 12001 | 1500 | 2100 | |
| 0 | 9 | 13501 | 1500 | 2500 | |
| 0 | 10 | 15001 | 1500 | 2600 | |
| ... | ... | ... | ... | ... | |

| Conn.ID | Ack.ID | Ack | Time | Data.ID | 116 |
|---|---|---|---|---|---|
| 0 | 0 | 15001 | 2700 | 9 | |
| ... | ... | ... | ... | ... | |

| Conn.ID | Size | Time.Gap | 117 |
|---|---|---|---|
| 0 | 3000 | 200 | |

FIG. 17A

| S118 | | | 113 | | | |
|---|---|---|---|---|---|---|
| Conn.ID | Status | Start.ID | Num.Stream | Ex.RWIN | Now.Data.ID | Now.Ack.ID |
| 0 | SET_ID | | 2 | 65700 | 14 | 7 |
| ... | ... | ... | ... | ... | ... | ... |

| Conn.ID | Data.ID | Seq | Len | Time | 115 |
|---|---|---|---|---|---|
| ... | ... | ... | ... | ... | |
| 0 | 12 | 1501 | 1500 | 600 | |
| 0 | 13 | 3001 | 1500 | 1000 | |
| 0 | 14 | 4501 | 1500 | 1100 | |
| ... | ... | ... | ... | ... | |

| Conn.ID | Ack.ID | Ack | Time | Data.ID | 116 |
|---|---|---|---|---|---|
| ... | ... | ... | ... | ... | |
| 0 | 7 | 3001 | 1300 | 12 | |
| ... | ... | ... | ... | ... | |

| Conn.ID | Status | Start.ID | Num.Stream | Ex.RWIN | Now.Data.ID | Now.Ack.ID |
|---|---|---|---|---|---|---|
| 0 | SET_ID | 15 | 2 | 65700 | 15 | 7 |
| ... | ... | ... | ... | ... | ... | ... |

| Conn.ID | Data.ID | Seq | Len | Time | |
|---|---|---|---|---|---|
| ... | ... | ... | ... | ... | 115 |
| 0 | 12 | 1501 | 1500 | 600 | |
| 0 | 13 | 3001 | 1500 | 1000 | |
| 0 | 14 | 4501 | 1500 | 1100 | |
| 0 | 15 | 6001 | 1500 | 1500 | |
| ... | ... | ... | ... | ... | |

| Conn.ID | Ack.ID | Ack | Time | Data.ID | |
|---|---|---|---|---|---|
| ... | ... | ... | ... | ... | 116 |
| 0 | 7 | 3001 | 1300 | 12 | |
| ... | ... | ... | ... | ... | |

FIG. 17C

| S120 | | | 113 | | | |
|---|---|---|---|---|---|---|
| Conn.ID | Status | Start.ID | Num.Stream | Ex.RWIN | Now.Data.ID | Now.Ack.ID |
| 0 | SET_ID | 15 | 2 | 65700 | 15 | 8 |
| ... | ... | ... | ... | ... | ... | ... |

| Conn.ID | Data.ID | Seq | Len | Time | |
|---|---|---|---|---|---|
| ... | ... | ... | ... | ... | 115 |
| 0 | 12 | 1501 | 1500 | 600 | |
| 0 | 13 | 3001 | 1500 | 1000 | |
| 0 | 14 | 4501 | 1500 | 1100 | |
| 0 | 15 | 6001 | 1500 | 1500 | |
| ... | ... | ... | ... | ... | |

| Conn.ID | Ack.ID | Ack | Time | Data.ID | |
|---|---|---|---|---|---|
| ... | ... | ... | ... | ... | 116 |
| 0 | 7 | 3001 | 1300 | 12 | |
| 0 | 8 | 6001 | 1800 | 14 | |
| ... | ... | ... | ... | ... | |

PACKET ANALYSIS METHOD, PACKET ANALYSIS DEVICE, AND STORAGE MEDIUM

CROSS-REFERENCE TO RELATED APPLICATION

This application is based upon and claims the benefit of priority from the prior Japanese Patent Application No. 2013-165410 filed on Aug. 8, 2013, the entire contents of which are incorporated herein by reference.

FIELD

The embodiments discussed herein are related to a packet analysis method, a packet analysis device, and a storage medium.

BACKGROUND

As a method of estimating a network bandwidth between terminals, there is a method of actively diagnosing traffic of a network (hereinafter referred to as "active diagnosis") and a method of passively diagnosing traffic of a network (hereinafter referred to as "passive diagnosis"). In the active diagnosis, a diagnosis device measures a network bandwidth by flowing packets having a network bandwidth diagnosis pattern that has been prepared beforehand through the network. Thus, there are problems that a diagnosis pattern has to be prepared and packets that are not desired for the network flow through the network.

In the passive diagnosis, it is assumed that all packets that flow through the network are measurement targets. As the passive diagnosis, a technology is known in which a packet that arrives at a path is captured in which packets that are monitoring targets are collected, and a communication quality of a client is analyzed for each location based on location information of the client in each of the packets, for each connection. As a related art, for example, Japanese Laid-open Patent Publication No. 2003-258881, Japanese Laid-open Patent Publication No. 2012-191440, and the like are disclosed.

However, in the passive diagnosis, there is a problem that it is difficult to measure an accurate bandwidth of the network. This problem, that is, the difficulty of measuring an accurate bandwidth of the network is described below.

Continuous packets that are suitable for measurement of a bandwidth may not typically flow through the network. The terminal on the network performs flow control in which packets are transmitted at intervals in order to avoid congestion of the network. Therefore, measurement of an accurate bandwidth may be achieved by removing a packet the transmission of which is delayed by the flow control.

Generally, it is probable that a packet that is transmitted immediately after an acknowledge packet (ACK) has been received from among packets that are continuously transmitted from the terminal is generally affected by the flow control. However, it is difficult to identify a packet that is transmitted immediately after an ACK has been received, at an observation point, due to a time difference of transmission/reception of the packet between the terminal, and the observation point between terminals. FIG. 21 is a diagram illustrating deviation between transmission timing of a terminal and reception timing of an observation point.

As illustrated in FIG. 21, in a packet analysis device at the observation point, packets that are received between ACKs may not correspond to continuous packets that have been continuously transmitted from the terminal. Here, in the packet analysis device, data packets that are received at the times of "d1" and "d2" correspond to continuous packets, and data packets that are received at the times of "d3" and "d4" correspond to continuous packets. After that, the packet analysis device receives data packets at the times of "d2" and "d3" between an ACK that is received at the time of "a1" and an ACK that is received at the time of "a2". Thus, packets that are received between ACKs may not correspond to continuous packets.

The packet analysis device at the observation point may not receive a data packet that corresponds to an ACK immediately after the ACK has been received. Here, the packet analysis device receives an ACK at the time of "a1", and receives a data packet that corresponds to the received ACK, at the time of "d3". The packet analysis device receives continuous packets that correspond to a further ACK, at the time of "d2" immediately after the ACK at the time of a1 has been received. Thus, the packet analysis device may not receive a data packet that corresponds to an ACK immediately after the ACK has been received. That is, at the observation point, it is difficult to identify a packet that has been affected by the flow control.

SUMMARY

According to an aspect of the invention, a packet analysis method that is executed by a packet analysis device that analyzes a packet communicated between a first device and a second device, the packet analysis method includes acquiring a first acknowledge packet transmitted from the first device and a second acknowledge packet transmitted from the first device after the first acknowledge packet; acquiring a plurality of packets transmitted from the second device during a period from reception of the first acknowledge packet to reception of the second acknowledge packet; identifying a number of packets corresponding to data transmitted from the second device to the first device among the plurality of packets, by calculating a difference between a first identification number corresponding to the first acknowledge packet and a second identification number corresponding to the second acknowledge packet; calculating a plurality of bandwidth values, a number of the plurality of bandwidth values is identical to the number of packets corresponding to the data, based on acquisition timings that indicate timings at which the plurality of packets is respectively acquired and an interval between the acquisition timings of two adjacent packets from among the plurality of packets; and determining a bandwidth value that is to be removed from the plurality of bandwidth values by comparing the plurality of bandwidth values with each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data structure of a connection management table;

FIG. 6 is a diagram illustrating an example of a data structure of a DATA table;

FIG. 7 is a diagram illustrating an example of a data structure of an ACK table;

FIG. 8 is a diagram illustrating an example of a data structure of a statistical information table;

FIG. 14E is a fifth diagram illustrating the transition of the tables when the number of continuous packets is identified;

FIG. 15A is a first diagram illustrating transition of tables when continuous packets are identified;

FIG. 15B is a second diagram illustrating the transition of the tables when the continuous packets are identified;

FIG. 15E is a fifth diagram illustrating the transition of the tables when the continuous packets are identified;

FIG. 16B is a second diagram illustrating the transition of the tables when the reset processing is executed;

FIG. 16E is a fifth diagram illustrating the transition of the tables when the reset processing is executed;

FIG. 16F is a sixth diagram illustrating the transition of the tables when the reset processing is executed;

FIG. 17A is a first diagram illustrating transition of tables when a transmission pattern of continuous packets is not stabilized;

FIG. 17B is a second diagram illustrating the transition of the tables when the transmission pattern of the continuous packets is not stabilized;

FIG. 17C is a third diagram illustrating the transition of the tables when the transmission pattern of the continuous packets is not stabilized;

DESCRIPTION OF EMBODIMENTS

Embodiments that are related to a storage medium storing a packet analysis program, a packet analysis device, and a packet analysis method are described in detail below with reference to drawings. The aspects of the disclosure discussed herein are not limited to such embodiments.

Figure 1:
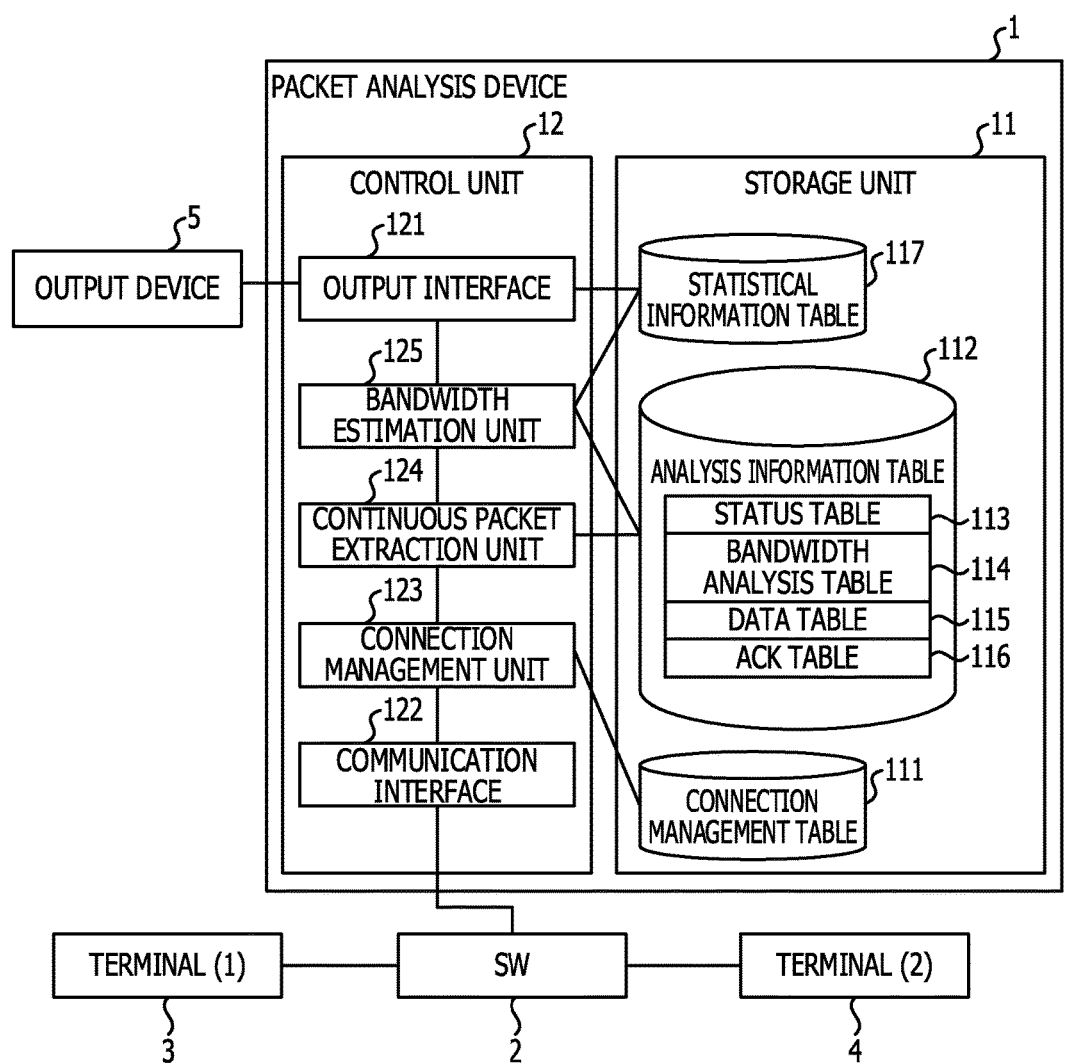
FIG. 1 is a diagram illustrating a functional structure of a packet analysis device according to an embodiment.

FIG. 1 is a diagram illustrating a functional structure of a packet analysis device according to an embodiment. As illustrated in FIG. 1, a packet analysis device 1 obtains a packet that is communicated between a terminal 3 and a terminal 4, through a SW 2, and diagnoses a network bandwidth passively. In the embodiment, it is assumed that each of the terminals 3 and 4 performs communication using a transmission control protocol (TCP).

An example of a characteristic of a communication function of the TCP is described below. The terminal 3 is a transmission terminal of a data packet, and the terminal 4 is a reception terminal of a data packet. When the terminal 4 (hereinafter also referred to as reception terminal 4) receives data, based on a sequence number and the data size of the data, a sequence number of data that is to be transmitted next is set to an acknowledge number of an ACK, and the ACK is transmitted to the transmission terminal 3 (hereinafter also referred to as transmission terminal 3). The transmission terminal 3 transmits a next data packet by receiving an ACK and checking an acknowledge number of the received ACK.

However, when the transmission terminal 3 performs reception, check, and transmission for each data packet, excellent communication efficiency is not obtained. Therefore, in the TCP, "window control" is performed. The window control does not correspond to reception, check, and transmission for each data packet by the transmission terminal 3, but corresponds to continuous transmission of a plurality of data packets by the terminal 3. That is, the transmission terminal 3 manages the plurality of data packets in a unit called a window size. The transmission terminal 3 continuously transmits the data packets without waiting for an acknowledge number of an ACK. Due to such window control, the communication efficiency is improved. The data packets that are continuously transmitted by the window control are referred to as "continuous packets".

However, when the transmission terminal 3 transmits a large amount of packet data at once, it is probable that congestion occurs in a network, or overflow of a buffer occurs in a communication interface of the reception terminal 4. Therefore, flow control in which an amount of continuous packets is limited is performed in the communication of the TCP so that overflow does not occur in the reception terminal 4. In the flow control, as an example, the reception terminal 4 transmits a receiver window size (RWIN) that indicates a buffer size in which overflow does not occur in the reception terminal 4, to the transmission terminal 3. As a further example, in the flow control, an amount of packets that are continuously transmitted is gradually increased so that congestion does not occur, and an amount of continuous packets is reduced when congestion occurs. When the flow control is performed, the certainty and the accuracy of the communication are kept. For example, in the flow control, an amount of continuous packets is limited using a window size defined by a minimum value of an RWIN and a sender window size (SWIN) that indicates a control amount of the transmission terminal 3.

Using such a characteristic of the flow control in the communication function of the TCP, the packet analysis device 1 identifies a packet that is affected by the flow control, from captured packets. In addition, the packet analysis device 1 removes the identified packet and diagnoses a network bandwidth merely using continuous packets. Here, "capture of a packet" means obtaining of a packet of traffic, which flows over the network.

The packet analysis device 1 includes a storage unit 11 and a control unit 12.

The storage unit 11 is a storage device of a non-volatile semiconductor memory element or the like such as a flash memory and a ferroelectric random access memory (FRAM) (registered trademark). The storage unit 11 includes a connection management table 111, an analysis information table 112, and a statistical information table 117. The analysis information table 112 includes a status table 113, a bandwidth analysis table 114, a DATA table 115, and an ACK table 116.

The connection management table 111 manages communication information on a transmission source and a transmission destination for each connection. The connection management table 111 is used to search for a connection of a captured packet.

The analysis information table 112 stores analysis information. The analysis information table 112 is used to diagnose a network bandwidth. The analysis information table 112 includes the status table 113, the bandwidth analysis table 114, the DATA table 115, and the ACK table 116. The status table 113 stores various statuses information for connections. The bandwidth analysis table 114 stores data on interval between timings at which continuous packets are captured. The bandwidth analysis table 114 includes a table for each connection. The DATA table 115 stores an index number, an arrival time, and a packet length of a data packet when the data packet is captured. The DATA table 115 includes a table for each connection. The ACK table 116 stores an arrival time and an index number of a data packet that corresponds to an ACK when the ACK is obtained. The ACK table 116 includes a table for each connection.

The statistical information table 117 stores statistical information. The statistical information table 117 stores final statistics information of a diagnosis of a network bandwidth. The data structures of the various tables of the storage unit 11 are described later.

The control unit 12 includes an internal memory that is used to store control data and a program in which various processing procedures are defined, and executes various pieces of processing by the program and the internal memory. The control unit 12 is, for example, an electronic circuit of an integrated circuit such as an application specific integrated circuit (ASIC) or a field programmable gate array (FPGA). The control unit 12 is, for example, an electronic circuit such as a central processing unit (CPU) or a micro processing unit (MPU). The control unit 12 includes an output interface 121, a communication interface 122, a connection management unit 123, a continuous packet extraction unit 124, and a bandwidth estimation unit 125.

The output interface 121 is an interface with an output device 5. For example, the output interface 121 edits statistical information that has been stored in the statistical information table 117, and outputs the statistical information to the output device 5.

The communication interface 122 captures a packet that is communicated between the terminal 3 and the terminal 4, through the SW 2. The communication interface 122 delivers the captured packet to the connection management unit 123.

The connection management unit 123 manages a connection of the captured packet. For example, the connection management unit 123 refers to the connection management table 111, and determines whether or not a packet that has the same connection information as the packet has been captured before. When the connection management unit 123 determines that the packet has not been captured before, the connection management unit 123 adds connection information of the currently captured packet, to the connection management table 111. The connection management unit 123 determines that the packet has been captured before, the connection management unit 123 does not do anything. The connection information includes, for example, an IP address of a transmission source, a port number of the transmission source, an IP address of a transmission destination, and a port number of the transmission destination.

The continuous packet extraction unit 124 analyzes a correspondence relationship between an ACK and a data packet, and extracts continuous packets. In addition, the continuous packet extraction unit 124 identifies the number of continuous packets. For example, the continuous packet extraction unit 124 correlates an ACK with a data packet based on a sequence number and a packet length of the data packet, and an acknowledge number of the ACK. In addition, the continuous packet extraction unit 124 identifies the number of data packets that have been transmitted from the terminal 3, for which the terminal 4 sends back an ACK. That is, the continuous packet extraction unit 124 identifies the number of continuous packets. The continuous packet extraction unit 124 extracts continuous packets using the connection management table 111 and the analysis information table 112. The detail of the continuous packet extraction unit 124 is described later.

The bandwidth estimation unit 125 estimates a network bandwidth. For example, the bandwidth estimation unit 125 identifies a data packet that is affected by flow control, from the continuous packets that have been extracted by the continuous packet extraction unit 124. That is, the bandwidth estimation unit 125 measures a bandwidth for each of the numbers of continuous packets using data packets that correspond to an ACK as a reference. In addition, the bandwidth estimation unit 125 holds the measured bandwidth in the bandwidth analysis table 114 as analysis data. In addition, the bandwidth estimation unit 125 calculates an average bandwidth for each piece of analysis data, and identifies a data packet that has been affected by the flow control by comparing the sizes of the average bandwidths. A basic measurement method of a bandwidth is represented by the following formula (1).

Bandwidth (Mbps)=8×packet size/intervals between packets      formula (1)

Here, the data packet that has been affected by the flow control is transmitted after an ACK is received in order to suppress congestion. Therefore, the average bandwidth is reduced as compared with the continuous packets. This is why, in the data packet that has been affected by the flow control, an interval between packets is increased as compared with the continuous packets. Thus, the bandwidth estimation unit 125 identifies analysis data in which the average bandwidth is a minimum value, from among pieces of analysis data, as analysis data of a packet data group that has been affected by the flow control. In addition, the bandwidth estimation unit 125 removes the identified analysis data, and diagnoses the network bandwidth using the remaining analysis data. The remaining analysis data is analysis data in a packet group of continuous packets that are not affected by the flow control. The bandwidth estimation unit 125 estimates a bandwidth using the analysis information table 112 and the statistical information table 117. The detail of the bandwidth estimation unit 125 is described later.

Figure 2:
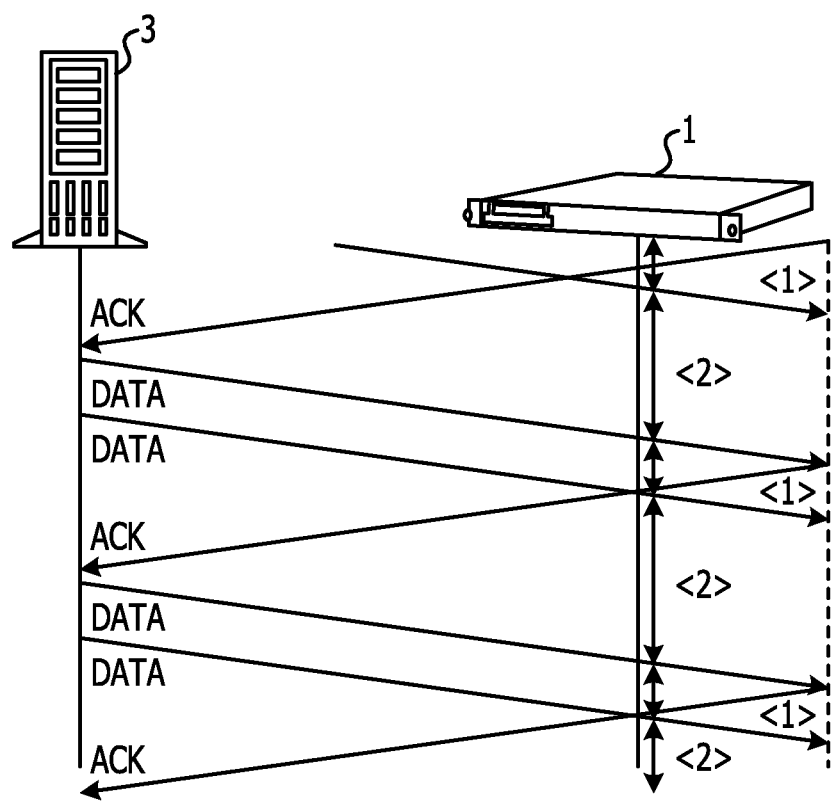
FIG. 2 is a diagram illustrating a specific example of processing of the packet analysis device according to the embodiment.

A specific example of processing of the packet analysis device 1 according to the embodiment is described below with reference to FIGS. 1 and 2. FIG. 1 is a diagram illustrating the specific example of the processing of the packet analysis device 1 according to the embodiment. As illustrated in FIG. 2, the continuous packet extraction unit 124 identifies the number of data packets that have been transmitted from the terminal 3, for which the terminal 4 sends back an ACK. That is, the continuous packet extraction unit 124 identifies the number of continuous packets. Here, the number of continuous packets is identified as two.

In addition, the bandwidth estimation unit 125 measures a bandwidth for each of the numbers of continuous packets using a data packet that corresponds to an ACK as a reference. Here, the number of continuous packets is two, so that intervals between packets are combined with each other and the packet sizes are combined with each other for each of <1> and <2>. In addition, the bandwidth estimation unit 125 calculates an average bandwidth of <1> by substituting the packet size that is calculated in <1> and the interval between the packets, which is calculated in <1>, into the formula (1). The bandwidth estimation unit 125 calculates an average bandwidth of <2> by substituting the packet size that is calculated in <2> and the interval between the packets, which is calculated in <2>, into the formula (1).

In addition, the bandwidth estimation unit 125 identifies the data packet that has been affected by the flow control by comparing the sizes of the average bandwidths with each other. Here, the interval between the packets of <2> is larger than the interval between the packets of <1>, so that the average bandwidth of <2> is smaller than the average bandwidth of <1>. Thus, analysis data of the average bandwidth of <2> is identified as analysis data of a packet data group that has been affected by the flow control.

In addition, the bandwidth estimation unit 125 removes the identified analysis data of the packet group, and diagnoses the network bandwidth using the remaining analysis data. That is, the bandwidth estimation unit 125 removes the analysis data of <2>. In addition, an average bandwidth that is calculated from the remaining analysis data of <1> is estimated as a network bandwidth.

As described above, the bandwidth estimation unit 125 may identify a packet that is improper for estimation of the bandwidth. As a result, the bandwidth estimation unit 125 may measure an accurate bandwidth by removing the identified improper packet.

Figure 4:
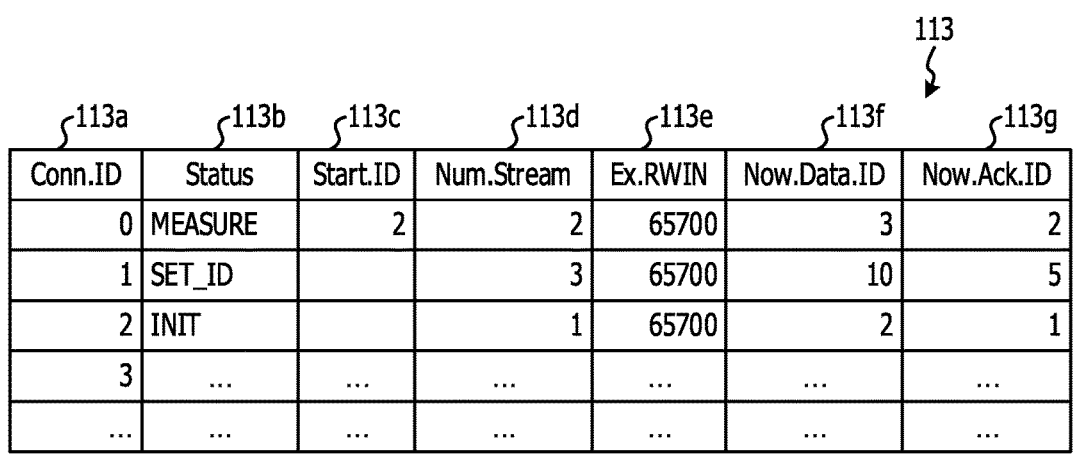
FIG. 4 is a diagram illustrating an example of a data structure of a status table.
Figure 5:
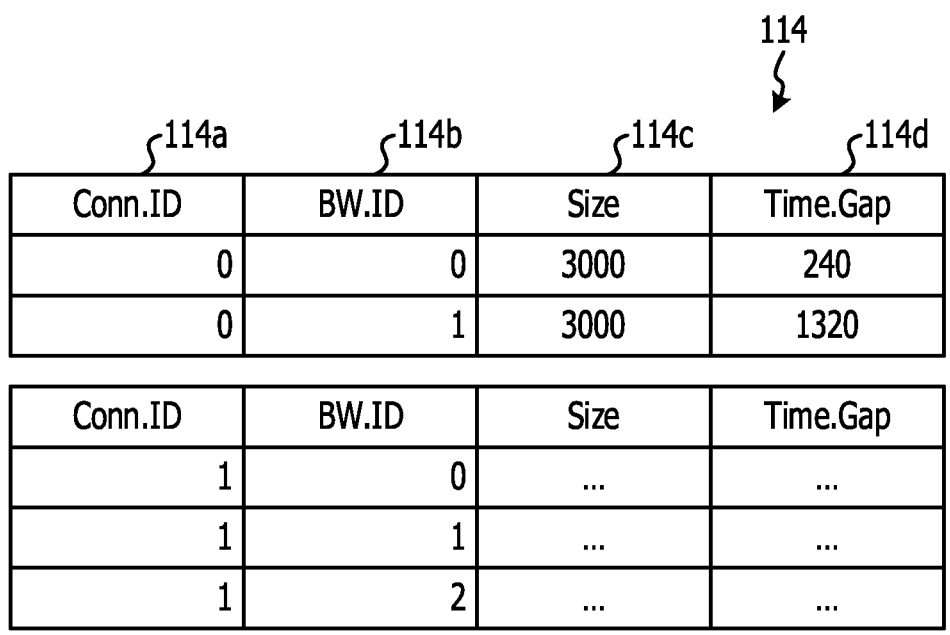
FIG. 5 is a diagram illustrating an example of a data structure of a bandwidth analysis table.
Figure 8:
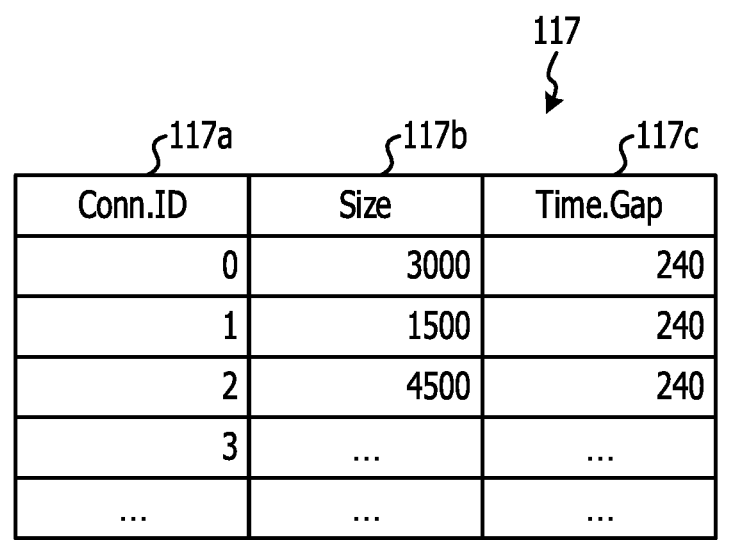

The data structures of various tables that are used in the packet analysis device 1 are described below with reference to FIGS. 3 to 8. FIG. 3 is a diagram illustrating an example of a data structure of the connection management table. FIG. 4 is a diagram illustrating an example of a data structure of the status table. FIG. 5 is a diagram illustrating an example of a data structure of the bandwidth analysis table. FIG. 6 is a diagram illustrating an example of the data structure of a DATA table. FIG. 7 is a diagram illustrating an example of the data structure of an ACK table. FIG. 8 is a diagram illustrating an example of the data structure of a statistical information table.

As illustrated in FIG. 3, the connection management table 111 associates data items of "Src.IP" 111b, "Src.Port" 111c, "Dst.IP" 111d, and "Dst.Port" 111e, with a data item of "Conn.ID" 111a and stores the data items. "Conn.ID" 111a is an index number that is assigned for each connection. "Src.ID" 111b is an IP address of a transmission source. Here, "Src.Port" 111c is a port number of the transmission source in the TCP. "Dst.IP" 111d is an IP address of a transmission destination. "Dst.Port" 111e is a port number of the transmission destination in the TCP.

As an example, when "Conn.ID" 111a is "0", "10.25.100.100" is stored as "Src.IP" 111b, and "80" is stored as "Src.Port" 111c. In addition, "10.25.200.100" is stored as "Dst.IP" 111d, and "200" is stored as "Dst.Port" 111e.

As illustrated in FIG. 4, the status table 113 associates data items of "Status" 113b, "Start.ID" 113c, "Num.Stream" 113d, and "Ex.RWIN" 113e, with a data item of "Conn.ID" 113a and stores the data items. In addition, the status table 113 associates data items of "Now.Data.ID" 113f and "Now.Ack.ID" 113g with the data item of "Conn.ID" 113a. Here, "Conn.ID" 113a is an index number that is assigned for each connection. "Status" 113b is a current status at the time of bandwidth measurement. To "Status" 113b, for example, "INIT" that indicates an initial value, "SET_ID" that indicates that information on a data packet that is used for bandwidth measurement is being set, and "MEASURE" that indicates that a bandwidth is being measured are set. "Start.ID" 113c is an ID of a data packet for which bandwidth measurement is started. "Num.Stream" 113d is the number of continuous packets. "Ex.RWIN" 113e is an empty buffer size in which overflow does not occur in the reception terminal 4. To "Ex.RWIN" 113e, a previous RWIN is set. "Now.Data.ID" 113f is an ID of a current data packet. "Now.Ack.ID" 113g is an ID of a current ACK.

As an example, when "Conn.ID" 113a is "0", "MEASURE" is stored as "Status" 113b, and "2" is stored as "Start.ID" 113c, and "2" is stored as "Num.Stream" 113d. "65700" is stored as "Ex.RWIN" 113e, and "3" is stored as "Now.Data.ID" 113f, and "2" is stored as "Now.Ack.ID" 113g.

As illustrated in FIG. 5, the bandwidth analysis table 114 associates data items of "Conn.ID" 114a, "BW.ID" 114b, "Size" 114c, and "Time.Gap" 114d with each other and stores the data items. The bandwidth analysis table 114 includes a table for each "Conn.ID" 114a. "Conn.ID" 114a is an index number that is assigned for each connection. "BW.ID" 114b is an index number in each table. To "BW.ID" 114b, an index number for each of the numbers of continuous packets that is indicated by "Num.Stream" 113d of the status table 113 is set. "Size" 114c is a total of packet sizes that have been measured. "Time.Gap" 114d is a total of arrival time intervals between packets, which have been measured.

As an example, when "Conn.ID" 114a is "0", and "BW.ID" 114b is "0", "3000" is stored as "Size" 114c, and "240" is stored as "Time.Gap" 114d. When "Conn.ID" 114a is "0", and "BW.ID" 114b is "1", "3000" is stored as "Size" 114c, and "1320" is stored as "Time.Gap" 114d.

As illustrated in FIG. 6, the DATA table 115 associates data items of "Conn.ID" 115a, "Data.ID" 115b, "Seq" 115c, "Len" 115d, and "Time" 115e with each other and stores the data items. The DATA table 115 includes a table for each "Conn.ID" 115a. "Conn.ID" 115a is an index number that is assigned for each connection. "Data.ID" 115b is an index number of a data packet. "Seq" 115c is a sequence number of the data packet. "Len" 115d is a packet length of the data packet. "Time" 115e is an arrival time of the data packet at the packet analysis device 1.

As an example, when "Conn.ID" 115a is "0", and "Data.ID" 115b is "0", "1500" is stored as "Seq" 115c, and "1500" is stored as "Len" 115d, and "1000" is stored as "Time" 115e. When "Conn.ID" 115a is "0", and "Data.ID" 115b is "1", "3000" is stored as "Seq" 115c, "1500" is stored as "Len" 115d, and "1120" is stored as "Time" 115e.

As illustrated in FIG. 7, the ACK table 116 associates data items of "Conn.ID" 116a, "Ack.ID" 116b, "Ack" 116c, "Time" 116d, and "Data.ID" 116e with each other and stores the data items. The ACK table 116 includes a table for each "Conn.ID" 116a. "Conn.ID" 116a is an index number that is assigned for each connection. "Ack.ID" 116b is an index number of an ACK. "Ack" 116c is an acknowledge number of the ACK. That is, to "Ack" 116c, a sequence number of a data packet that is to be transmitted next is set. "Time" 116d is an arrival time of the ACK at the packet analysis device 1. "Data.ID" 116e is an index number (Data.ID) of a data packet that corresponds to the ACK. That is, "Data.ID" 116e indicates that the packet is a data packet that corresponds to the ACK that is indicated by "Ack.ID" 116b.

As an example, when "Conn.ID" 116a is "0", and "Ack.ID" 116b is "0", "3000" is stored as "Ack" 116c, and "3000" is stored as "Time" 116d, and "0" is stored as "Data.ID" 116e. When "Conn.ID" 116a is "0", and "Ack.ID" 116b is "1", "6000" is stored as "Ack" 116c, and "3240" is stored as "Time" 116d, and "2" is stored as "Data.ID" 116e.

As illustrated in FIG. 8, the statistical information table 117 associates data items of "Size" 117b and "Time.Gap" 117c, with a data item of "Conn.ID" 117a, and stores the data items. "Conn.ID" 117a is an index number that is assigned for each connection. "Size" 117b is a total of packet sizes of measured continuous packets. "Time.Gap" 117c is a total of arrival time intervals between the packets in the measured continuous packets.

As an example, when "Conn.ID" 117a is "0", "3000" is stored as "Size" 117b, and "240" is stored as "Time.Gap" 117c.

Figure 9A:
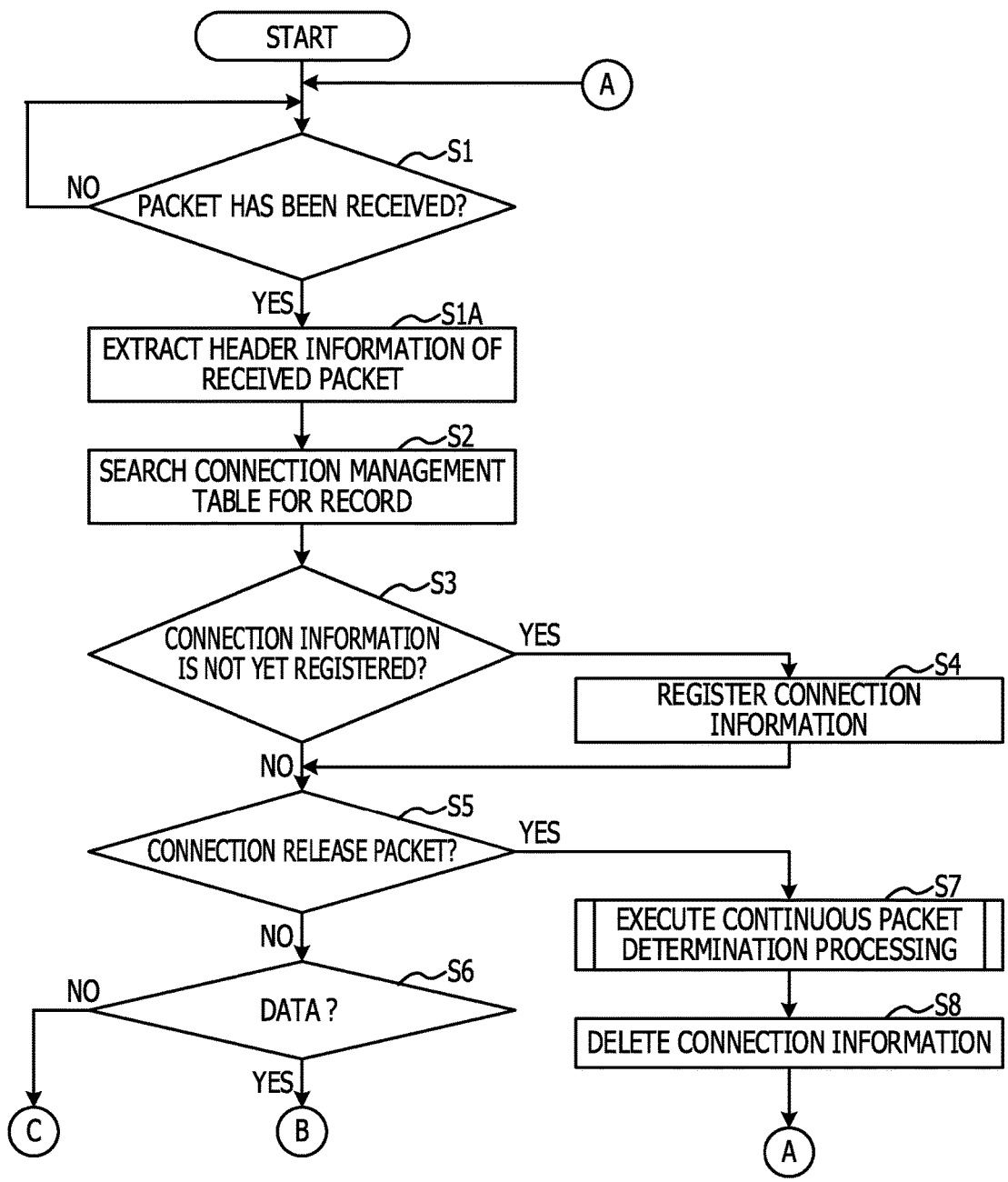
FIG. 9A is a diagram illustrating a flowchart of processing of a connection management unit.
Figure 9B:
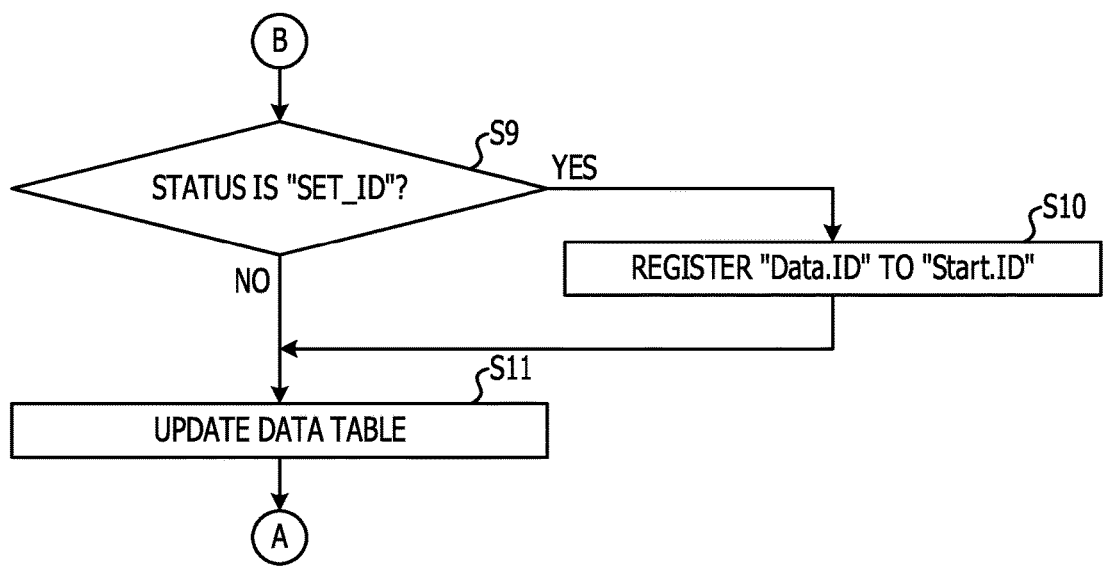
FIG. 9B is a diagram illustrating a flowchart of processing when a data packet is received.
Figure 9C:
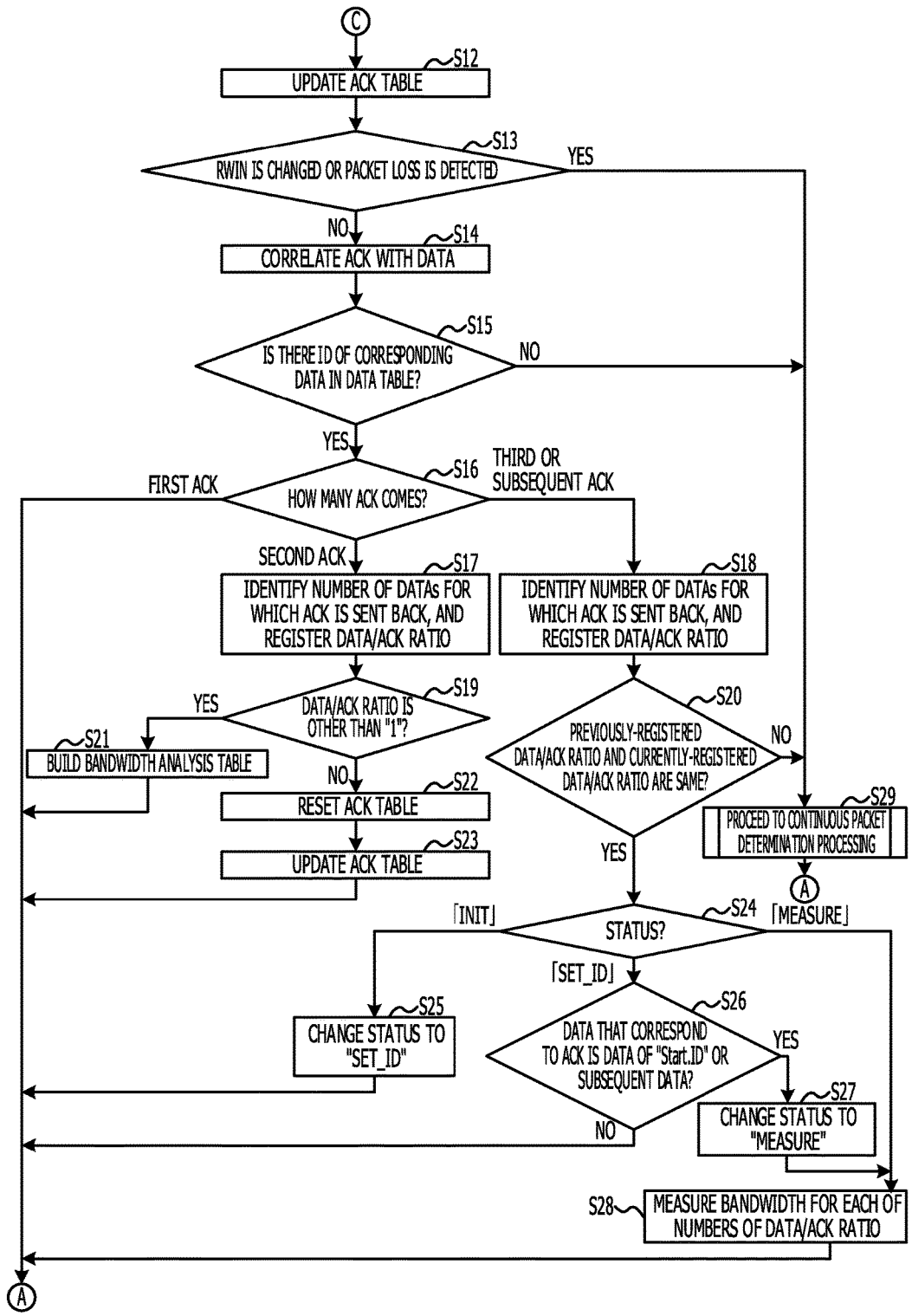
FIG. 9C is a diagram illustrating a flowchart of processing when an ACK is received.
Figure 9D:
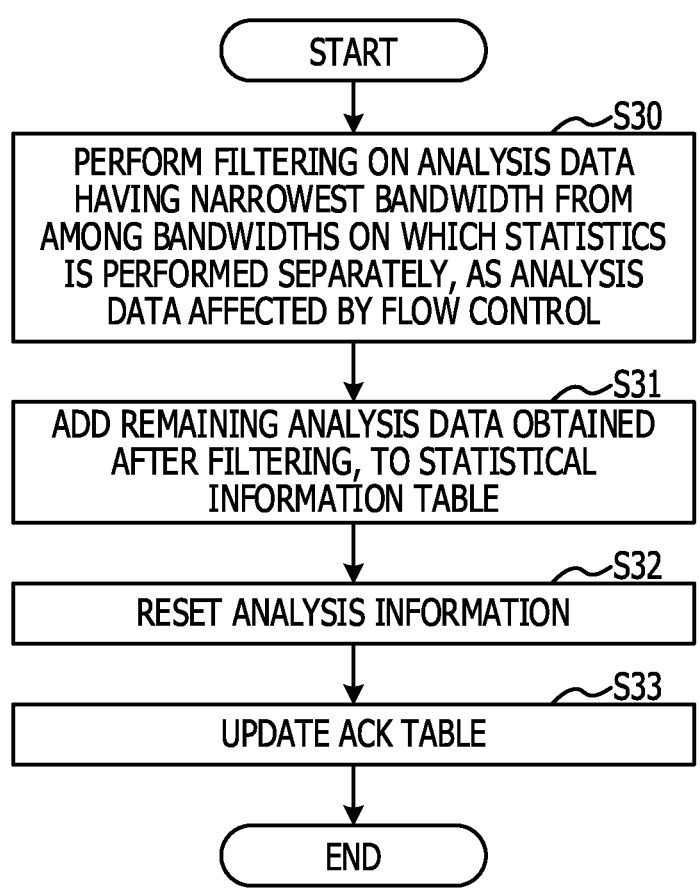
FIG. 9D is a diagram illustrating a flowchart of continuous packet determination processing.

A flowchart of packet analysis processing according to the embodiment is described below with reference to FIGS. 9A to 9D. FIG. 9A is a diagram illustrating a flowchart of processing of the connection management unit. FIG. 9B is a diagram illustrating a flowchart of processing when a data packet is received. FIG. 9C is a diagram illustrating a flowchart of processing when an ACK is received. FIG. 9D is a diagram illustrating a flowchart of continuous packet determination processing. In the flowcharts, a data packet is referred to as "DATA", and an acknowledge packet is referred to as "ACK".

As illustrated in FIG. 9A, the connection management unit 123 determines whether or not a packet has been received (S1). When the connection management unit 123 determines that a packet is not yet received (No in S1), the connection management unit 123 repeats the determination processing until a packet is received.

On the other hand, the connection management unit 123 determines that a packet has been received (Yes in S1), the connection management unit 123 extracts header information on the received packet (S1A). For example, the connection management unit 123 extracts an extracts an IP address of a transmission source and an IP address of a transmission destination, from an IP header. The connection management unit 123 extracts a port number of the transmission source, a port number of the transmission destination, a sequence number, an acknowledge number, a packet length, an RWIN, and a FIN flag, from a TCP header. The FIN flag indicates whether or not the packet is a connection release packet. For example, to the FIN flag, "ON" is set when the packet is a connection release packet. To the FIN flag, "OFF" is set when the packet is not a connection release packet.

In addition, the connection management unit 123 searches the information that has been stored in the connection management table 111 for a record that corresponds to the currently received connection information (S2). Here, the connection information corresponds to the IP address of the transmission source, the port number of the transmission source, the IP address of the transmission destinations, and the port number of the transmission destination. For example, the connection management unit 123 searches the connection management table 111 for the corresponding record using the connection information as a search condition. It is assumed that the connection is the same even when information on the transmission source and information on the transmission destination are switched.

In addition, the connection management unit 123 determines whether or not the connection information is not yet registered, as a result of searching for the corresponding record (S3). When the connection management unit 123 determines that the connection information has been already registered (No in S3), in the connection management unit 123, the flow proceeds to S5.

On the other hand, when the connection management unit 123 determines that the connection information is not yet registered (Yes in S3), the connection management unit 123 registers the connection information to the connection management table 111 (S4). For example, the connection management unit 123 adds an IP address ("Src.ID" 111b) and a port number ("Src.Port" 111c) of a transmission source to a new connection ID ("Conn.ID" 111a). In addition, the connection management unit 123 adds an IP address ("Dst.IP" 111d) and a port number ("Dst.Port" 111e) of the transmission destination, to the same record. In addition, in the connection management unit 123, the flow proceeds to S5.

In S5, the connection management unit 123 determines whether or not the received packet is a connection release packet (S5). For example, the connection management unit 123 refers to a FIN flag of the received packet, and determines whether or not the FIN flag corresponds to "ON".

When the connection management unit 123 determines that the received packet is a connection release packet (Yes in S5), that is, when the FIN flag corresponds to "ON", the connection management unit 123 executes continuous packet determination processing (S7). The detail of the continuous packet determination processing is described later. In addition, the connection management unit 123 deletes all pieces of information that are related to the connection information, from the connection management table 111 and the analysis information table 112 (S8). For example, the connection management unit 123 deletes records having the same connection ID (Conn.ID), from the connection management table 111 and the analysis information table 112. In addition, in the connection management unit 123, the flow proceeds to S1.

On the other hand, when the connection management unit 123 determines that the received packet is not a connection release packet (No in S5), that is, when the FIN flag does not correspond to "ON", the connection management unit 123 determines whether or not the packet is a DATA (S6). For example, the connection management unit 123 refers to the packet length of the TCP header and determines that the packet is an ACK when the packet length is "0". The connection management unit 123 determines that the packet is a DATA when the packet length is more than "0".

When the connection management unit 123 determines that the packet is a DATA (Yes in S6), in the connection management unit 123, the flow proceeds to S9 in order to proceed with processing when a data packet is received. On the other hand, the connection management unit 123 determines that the packet is not a DATA (No in S6), that is, when the packet is an ACK, in the connection management unit 123, the flow proceeds to S12 in order to proceed with processing when an ACK is received.

As illustrated in FIG. 9B, in S9, the connection management unit 123 determines whether or not the status of the status table 113 ("Status" 113b) is "SET_ID" (S9). Here, "SET_ID" indicates that information on a DATA that is used for bandwidth measurement is being set. When the connection management unit 123 determines that the status is "SET_ID" (Yes in S9), the connection management unit 123 registers an ID of the current DATA (Data.ID) to "Start.ID" 113c of the status table 113 (S10). In addition, in the connection management unit 123, the flow proceeds to S11.

On the other hand, when the connection management unit 123 determines that the status is not "SET_ID" (No in S9), in the connection management unit 123, the flow proceeds to S11.

In S11, the connection management unit 123 updates the DATA table 115 that corresponds to the same connection ID ("Conn.ID" 115a) (S11). The information to be updated is, for example, an ID of the current "DATA" ("Data.ID" 115a), a sequence number ("Seq" 115c), a packet length ("Len" 115d), and an arrival time of the DATA at an observation point ("Time" 115e). The observation point corresponds to the packet analysis device 1. The connection management unit 123 updates the ID of the current DATA to "Now.Data.ID" 113f of the status table 113. In addition, in the connection management unit 123, the flow proceeds to S1 in order to wait until a next packet arrives.

As illustrated in FIG. 9C, in S12, the connection management unit 123 updates the ACK table 116 that corresponds the same connection ID ("Conn.ID" 115a) (S12). The information to be updated is, for example, an ID of the current ACK ("Ack.ID" 116b), an acknowledge number ("Ack" 116c), and an arrival time of the ACK at an observation point ("Time" 116d). The observation point corresponds to the packet analysis device 1. The connection management unit 123 updates the ID of the current ACK to "Now.Ack.ID" 113f of the status table 113, and updates a value of an RWIN of the TCP header to "Ex.RWIN" 113e.

After that, the connection management unit 123 determines whether the RWIN is changed, or packet loss of the DATA is detected (S13). When the connection management unit 123 determines that the RWIN is changed or packet loss of the DATA is detected (Yes in S13), in the connection management unit 123, the flow proceeds to the continuous packet determination processing (S29).

On the other hand, the connection management unit 123 determines that the RWIN is not changed and packet loss of the DATA is not detected (No in S13), the continuous packet extraction unit 124 correlates an ACK with a DATA (S14). For example, the continuous packet extraction unit 124 searches the DATA table 115 and the ACK table 116 for an ID of a DATA that satisfies the following formula (2).

DATA table[Data.ID].Seq+DATA table[Data.ID].Len=ACK table[Now.Ack.ID].Ack     formula (2)

This is why a sequence number of a DATA that is to be transmitted next (sequence number (Seq115c)+packet length (Len115d) of the most recent DATA) is set to the acknowledge number of the ACK ("Ack" 116c).

In addition, the continuous packet extraction unit 124 determines whether or not there is an ID of the corresponding DATA in the DATA table (S15). When the continuous packet extraction unit 124 determines there is no ID of the corresponding DATA (No in S15), in the continuous packet extraction unit 124, the flow proceeds to the continuous packet determination processing (S29).

On the other hand, the continuous packet extraction unit 124 determines that there is an ID of the corresponding DATA (Yes in S15), the continuous packet extraction unit 124 records an ID of a DATA that corresponds to "Data.ID" 116e in the ACK table 116 because the association of the ACK with the DATA is established. In addition, the continuous packet extraction unit 124 determines whether how many ACKs come after the bandwidth measurement has started (S16).

When the continuous packet extraction unit 124 determines that the packet is a first ACK after the bandwidth measurement is started (first ACK in S16), in the continuous packet extraction unit 124, the flow proceeds to S1 in order to wait until a next packet arrives. On the other hand, when the continuous packet extraction unit 124 determines that the packet is a second ACK after the bandwidth measurement is started (second ACK in S16), the continuous packet extraction unit 124 identifies the number of DATAs for which an ACK is sent back, and registers the identified DATA/ACK ratio to the status table 113 (S17). For example, the continuous packet extraction unit 124 identifies a DATA/ACK ratio that satisfies the following formula (3), that is, the number of DATAs for an ACK (Num.Stream), based on the ACK table 116.

Num.Stream=ACK table[Now.Ack.ID].Data.ID-ACK table[Now.Ack.ID-1].Data.ID     formula (3)

This is why a difference between an ID of a DATA that corresponds to an ID of the current ACK and an ID of a DATA that corresponds to an ID of the previous ACK is a DATA/ACK ratio. In addition, the continuous packet extraction unit 124 registers the identified DATA/ACK ratio to "Num.Stream" 113d of the status table 113.

In addition, the bandwidth estimation unit 125 determines whether or not the DATA/ACK ratio is other than "1" (S19). When the bandwidth estimation unit 125 determines the DATA/ACK ratio is other than "1" (Yes in S19), the bandwidth estimation unit 125 builds the bandwidth analysis table 114 (S21). For example, the bandwidth estimation unit 125 creates a record of the bandwidth analysis table 114 for each of the values of the DATA/ACK ratio. In addition, in the bandwidth estimation unit 125, the flow proceeds to S1 in order to wait until the next packet arrives.

On the other hand, the bandwidth estimation unit 125 determines the DATA/ACK ratio is "1" (No in S19), the bandwidth estimation unit 125 resets a record that corresponds to an appropriate connection ID of the ACK table 116 because continuous packets are not transmitted (S22). In addition, the bandwidth estimation unit 125 updates information on the currently received ACK, to a first record of the ACK table 116 (S23). In addition, in the bandwidth estimation unit 125, the flow proceeds to S1 in order to wait until the next packet arrives.

On the other hand, the continuous packet extraction unit 124 determines that the packet is a third ACK or a subsequent ACK after the bandwidth measurement is started (third ACK or subsequent ACK in S16), the continuous packet extraction unit 124 identifies the number of DATAs for which an ACK is sent back, and registers the identified DATA/ACK ratio (S18). The identification method and the registration method are similar to the processing in S17, and the description is omitted herein.

In addition, the bandwidth estimation unit 125 determines whether or not the previously-registered DATA/ACK ratio and the currently-registered DATA/ACK ratio are same for "Num.Stream" 113d of the status table 113 (S20). When the bandwidth estimation unit 125 determines that the previously-registered DATA/ACK ratio and the currently-registered DATA/ACK ratio are not same (No in S20), in the bandwidth estimation unit 125, the flow proceeds to the continuous packet determination processing (S29).

When the bandwidth estimation unit 125 determines that the previously-registered DATA/ACK ratio and the currently-registered DATA/ACK ratio are same (Yes in S20), the bandwidth estimation unit 125 determines a status of the status table 113 ("Status" 113b) (S24).

When the bandwidth estimation unit 125 determines that the status is "INIT" ("INIT" in S24), the bandwidth estimation unit 125 changes the status of the status table 113 to "SET_ID" (S25). In addition, in the bandwidth estimation unit 125, the flow proceeds to S1 in order to wait until the next packet arrives.

When the bandwidth estimation unit 125 determines that the status is "SET_ID" ("SET_ID" in S24), the bandwidth estimation unit 125 determines whether or not the DATA that corresponds to the ACK is a DATA of "Start.ID" 113c of the status table 113 or a subsequent DATA (S26). The bandwidth estimation unit 125 determines whether or not the DATA that corresponds to the ACK is a DATA after a transmission pattern of the continuous packets is stabilized. When the bandwidth estimation unit 125 whether or not the DATA that corresponds to the ACK is not a DATA of "Start.ID" 113c or a subsequent DATA (No in S26), the bandwidth estimation unit 125 determines that the transmission pattern of the continuous packets is not stabilized, and in the bandwidth estimation unit 125, the flow proceeds to S1 in order to wait until the next packet arrives.

On the other hand, when the bandwidth estimation unit 125 determines that the DATA that corresponds to the ACK is a DATA of "Start.ID" 113c or a subsequent DATA (Yes in S26), the bandwidth estimation unit 125 changes the status of the status table 113 to "MEASURE" (S27). In addition, in the bandwidth estimation unit 125, the flow proceeds to S28.

When the bandwidth estimation unit 125 determines that the status is "MEASURE" ("MEASURE" in S24), in the bandwidth estimation unit 125, the flow proceeds to S28. In S28, the bandwidth estimation unit 125 measures a bandwidth for each of the value of DATA/ACK ratio (S28). For example, the bandwidth estimation unit 125 adds bandwidth data of the DATA that corresponds to the ACK, to a packet length ("Size" 114c) and an arrival time interval between packets ("Time.Gap" 114d) that correspond to a first ID of "BW.ID" 114b in the bandwidth analysis table 114. Here, the bandwidth data corresponds to a packet length of the DATA that corresponds to the ACK, and an arrival time interval between packets of the current DATA and the previous DATA. In addition, the bandwidth estimation unit 125 adds bandwidth data of the previous DATA for the current DATA that corresponds to the ACK, to a packet length ("Size" 114c) and an arrival time interval between packets ("Time.Gap" 114d) that correspond to a second ID of "BW.ID" 114b in the bandwidth analysis table 114. When the DATA/ACK ratio is "3", the bandwidth estimation unit 125 further adds bandwidth data of the one before previous DATA that corresponds to the ACK, to a packet length ("Size" 114c) and an arrival time interval between packets ("Time.Gap" 114d) that correspond to a third ID of "BW.ID" 114b. In addition, in the bandwidth estimation unit 125, the flow proceeds to S1 in order to wait until the next packet arrives.

In S29, after the continuous packet determination processing is executed, in the bandwidth estimation unit 125, the flow proceeds to S1 in order to wait until the next packet arrives.

As illustrated in FIG. 9D, the bandwidth estimation unit 125 performs filtering on analysis data having the narrowest bandwidth from among bandwidths on which statistics are performed separately, as analysis data that has been affected by the flow control (S30). For example, the bandwidth estimation unit 125 identifies that analysis data having the narrowest bandwidth as the analysis data that corresponds to a packet group that has been affected by the flow control, using the following formula (4). In the formula (4), "BW.ID" that is an index number that corresponds to the number of continuous packets is set as "i".

$$\operatorname{argmin}_i(\text{bandwidth analysis table}[i].\text{Size}/\text{bandwidth analysis table}[i].\text{Time.Gap}) \quad \text{formula (4)}$$

The analysis data having the narrowest bandwidth indicates "Size" 114c and "Time.Gap" 114d that corresponds to "i".

In addition, the bandwidth estimation unit 125 adds the remaining analysis data that is obtained after the filtering, to the statistical information table 117 (S31). For example, the bandwidth estimation unit 125 removes the analysis data that has been identified by the formula (4) of the bandwidth analysis table 114. In addition, the bandwidth estimation unit 125 adds "Size" 114c of the remaining analysis data to "Size" 117b of the statistical information table 117. In addition, the bandwidth estimation unit 125 adds "Time.Gap" 114d of the analysis data to "Time.Gap" 117c of the statistical information table 117.

In addition, the bandwidth estimation unit 125 resets the analysis information (S32). For example, the bandwidth estimation unit 125 resets records that correspond to appropriate connection IDs of the status table 113, the bandwidth analysis table 114, and the ACK table 116 of the analysis information table 112.

In addition, the bandwidth estimation unit 125 updates the information on the currently received ACK, to the first record of the ACK table 116 (S33). In addition, in the bandwidth estimation unit 125, the continuous packet determination processing ends.

Figure 10:
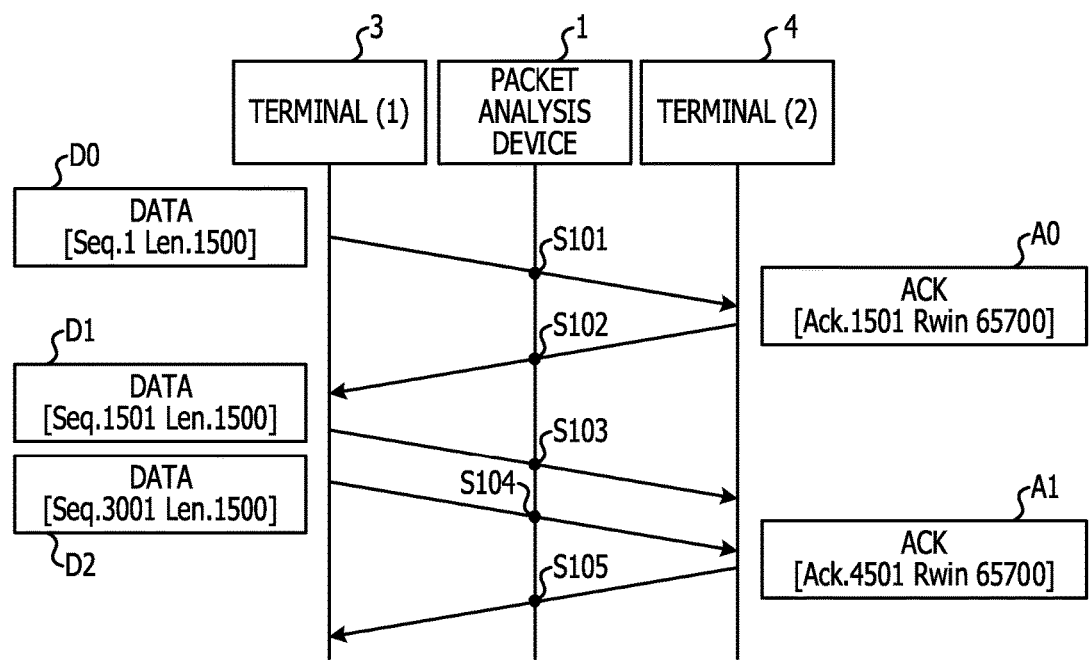
FIG. 10 is a diagram illustrating a sequence of processing when the number of continuous packets is identified.

A sequence of the processing when the number of continuous packets is identified is described below using contents of pieces of data in the various tables. FIG. 10 is a diagram illustrating the sequence of the processing when the number of continuous packets is identified. A description is made below using the various tables in the analysis information table 112 illustrated in FIGS. 14A to 14E. In the sequence, a data packet is referred to as "DATA", an acknowledge packet is referred to as "ACK". It is assumed that a connection ID is "0".

In S101, the packet analysis device 1 receives a DATA D0 that has been transmitted from the terminal 3. To the DATA D0, "1" is set as a sequence number (Seq). "1500" is set as the packet length (Len). The packet analysis device 1 determines whether or not a packet having the same connection has been received before, by referring to the connection management table 111. Here, the packet is received for the first time, so that the packet analysis device 1 determines that a packet having the same connection is not yet received. In addition, the packet analysis device 1 registers connection information of the currently received packet to the connection management table 111. When a FIN flag of a TCP header of the DATA D0 corresponds to "OFF", the packet analysis device 1 further determines whether or not the received packet is a DATA. Here, a packet length (Len) of the TCP header in the received packet is 1500, that is, more than 0, so that the packet analysis device 1 determines that the packet is a DATA.

In addition, the packet analysis device 1 refers to the status of the status table 113 ("Status" 113$b$). Here, to the status table 113, "INIT" is set as "Status" 113$b$ (see FIG. 14A and S101). Therefore, the packet analysis device 1 adds information that corresponds to the connection ID "0", to the DATA table 115. Here, to the DATA table 115, "0" is set as "Data.ID" 115$b$, and "1" is set as "Seq" 115$c$, and "1500" is set as "Len" 115$d$, and "100" is set as "Time" 115$e$ (see FIG. 14A and S101). "Time" 115$e$ is an arrival time of the DATA D0. The packet analysis device 1 updates "0" that is the ID of the current DATA D0 to "Now.Data.ID" 113$f$ of the status table 113 (see FIG. 14A and S101). After that, the processing of S101 ends.

In S102, the packet analysis device 1 receives an ACK A0 that has been transmitted from the terminal 4. To the ACK A0, "1501" is set as an acknowledge number (Ack), and "65700" is set as an RWIN (Rwin). After that, the packet analysis device 1 determines whether or not a packet having the same connection has been received before, by referring to the connection management table 111. Here, the packet does not correspond to a packet that is received for the first time, so that the packet analysis device 1 determines that the packet having the same connection has been received before. When a FIN flag of a TCP header of the ACK A0 corresponds to "OFF", the packet analysis device 1 further determines whether or not the received packet is a DATA. Here, a packet length (Len) of the TCP header in the received packet is 0, so that the packet analysis device 1 determines that the packet is an ACK.

In addition, the packet analysis device 1 adds information that corresponds to the connection ID "0", to the ACK table 116. Here, to the ACK table 116, "0" is set as "Ack.ID" 116$b$, and "1501" is set as "Ack" 116$c$, and "300" is set as "Time" 116$d$ (see FIG. 14B and S102). "Time" 116$d$ is an arrival time of the ACK A0.

In addition, the packet analysis device 1 correlates the ACK A0 with a DATA using the formula (2). Here, an ID of the current ACK is "0", so that "1501" is extracted as "ACKtable[0].Ack116$c$" (see FIG. 14B and S102). When "Data.ID" 115$b$ of the DATA table 115 is "0", "1" is extracted as "DATAtable[0].Seq115$c$", and "1500" is extracted as "DATAtable[0].Len115$d$" (see FIG. 14B and S102). After that, when "Data.ID" is "0", the formula (2) is satisfied, and the ACK A0 and the DATA D0 are associated with each other, so that the packet analysis device 1 performs recording of "0" that is an ID of the DATA that corresponds to "Data.ID" 116$e$ of the ACK table 116 (see FIG. 14B and S102). In addition, an ACK A1 is a first ACK, so that the processing of S102 ends.

In S103, the packet analysis device 1 receives a DATA D1 that has been transmitted from the terminal 3. After that, the packet analysis device 1 determines whether or not a packet having the same connection has been received before, by referring to the connection management table 111. Here, the packet does not correspond to a packet that is received for the first time, so that the packet analysis device 1 determines that the packet having the same connection has been received before. When a FIN flag of a TCP header of the DATA D1 corresponds to "OFF", the packet analysis device 1 further determines whether or not the received packet is a DATA. Here, a packet length (Len) of the TCP header in the received packet is 1500, that is, more than 0, so that the packet analysis device 1 determines that the packet is a DATA.

In addition, the packet analysis device 1 refers to the status of the status table 113 ("Status" 113$b$). Here, to the status table 113, "INIT" is set as "Status" 113$b$ (see FIG. 14C and S103). Therefore, the packet analysis device 1 adds information that corresponds to the connection ID "0", to the DATA table 115. Here, to the DATA table 115, "1" is set as "Data.ID" 115$b$, and "1501" is set as "Seq" 115$c$, and "1500" is set as "Len" 115$d$, and "500" is set as "Time" 115$e$ (see FIG. 14C and S103). "Time" 115$e$ is an arrival time of the DATA D1. The packet analysis device 1 updates "1" that is an ID of the current DATA D1, to "Now.Data.ID" 113$f$ of the status table 113 (see FIG. 14C and S103). After that, the processing of S103 ends.

In S104, the packet analysis device 1 receives a DATA D2 that has been transmitted from the terminal 3. Similar to S103, the packet analysis device 1 records information on the DATA D2, to the DATA table 115 and the status table 113 (see FIG. 14D and S104). After that, the processing of S104 ends.

In S105, the packet analysis device 1 receives an ACK A1 that has been transmitted from the terminal 4. After that, the packet analysis device 1 determines whether or not a packet having the same connection has been received before, by referring to the connection management table 111. Here, the packet does not correspond to a packet that is received for the first time, so that the packet analysis device 1 determines that the packet has been received before. When a FIN flag of a TCP header of the ACK A1 corresponds to "OFF", the packet analysis device 1 further determines whether or not the received packet is a DATA. Here, a packet length (Len) of the TCP header in the received packet is 0, so that the packet analysis device 1 determines that the packet is an ACK.

In addition, the packet analysis device 1 adds information that corresponds to the connection ID "0" to the ACK table 116. Here, to the ACK table 116, "1" is set as "Ack.ID"

116*b*, and "4501" is set as "Ack" 116*c*, and "800" is set as "Time" 116*d* (see FIG. 14E and S105). "Time" 116*d* is an arrival time of the ACK A1.

In addition, the packet analysis device 1 correlates the ACK A1 with a DATA using the formula (2). Here, an ID of the current ACK "1", so that "4501" is extracted as "ACK table[1].Ack116*c*" (see FIG. 14E and S105). When "Data.ID" 115*b* of the DATA table 115 is "2", "3001" is extracted as "DATA table[2].Seq115*c*", and "1500" is extracted as "DATA table[2].Len115*d*" (see FIG. 14D and S104). After that, when "Data.ID" is "2", the formula (2) is satisfied, and the ACK A1 and the DATA D2 are associated with each other, so that the packet analysis device 1 performs recording of "2" that is an ID of the DATA that corresponds to "Data.ID" 116*e* of the ACK table 116 (see FIG. 14E and S105).

In addition, the ACK A1 is a second ACK, so that the packet analysis device 1 identifies a DATA/ACK ratio that indicates the number of DATAs for which an ACK is sent back, using the formula (3). Here, an ID of the current ACK A1 is "1", and an ID of a DATA that corresponds to the ACK A1 is "2" based on the ACK table 116 (see FIG. 14E and S105). An ID of the previous ACK A0 is "0", and an ID of a DATA that corresponds to the ACK A0 is "0" based on the ACK table 116 (see FIG. 14D and S104). Here, the packet analysis device 1 identifies that an ACK is sent back for two DATAs, using the formula (3). Thus, the DATA/ACK ratio is "2". That is, the number of continuous packets is "2". Therefore, the packet analysis device 1 registers "2" that is the DATA/ACK ratio, to "Num.Stream" 113*d* of the status table 113 (see FIG. 14E and S105).

In addition, the packet analysis device 1 builds the bandwidth analysis table 114. Here, the packet analysis device 1 builds the record of the bandwidth analysis table 114 by a portion of "2" that is the DATA/ACK ratio (see FIG. 14E and S105). After that, the processing of S105 ends.

Figure 11:
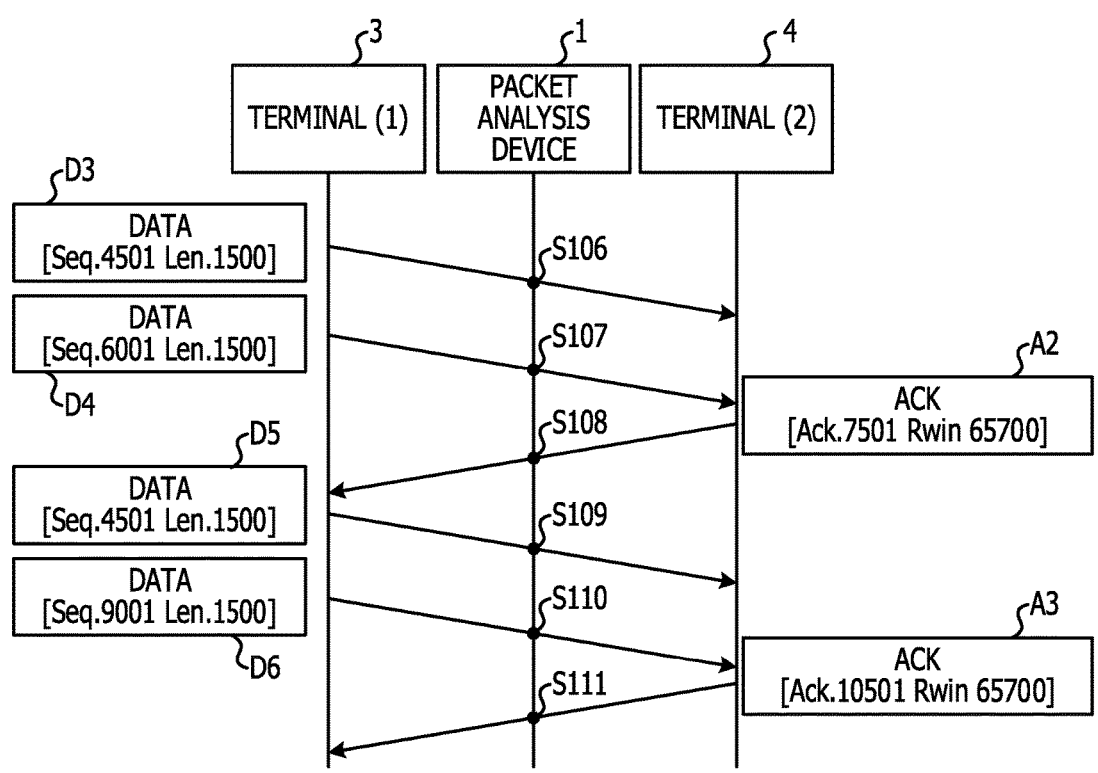
FIG. 11 is a diagram illustrating a sequence of processing when continuous packets are identified.

A sequence of the processing when continuous packets are identifies is described below using contents of pieces of data in the various tables. FIG. 11 is the sequence of the processing when continuous packets are identifies. Hereinafter, a description is made using the various tables in the analysis information table 112 illustrated in FIGS. 15A, 15B, 15C, 15D, 15E, and 15F. In the sequence, a data packet is referred to as "DATA", and an acknowledge packet is referred to as "ACK". It is assumed that the connection ID is "0".

In S106, the packet analysis device 1 receives a DATA D3 that has been transmitted from the terminal 3. Similar to S103, the packet analysis device 1 records information on the DATA D3, to the DATA table 115 and the status table 113 (see FIG. 15A and S106). After that, the processing of S106 ends.

In S107, the packet analysis device 1 receives a DATA D4 that has been transmitted from the terminal 3. Similar to S103, the packet analysis device 1 records information on the DATA D4, to the DATA table 115 and the status table 113 (see FIG. 15B and S107). After that, the processing of S107 ends.

In S108, the packet analysis device 1 receives an ACK A2 that has been transmitted from the terminal 4. After that, the packet analysis device 1 determines whether or not a packet having the same connection has been received before by referring to the connection management table 111. Here, the packet does not correspond to a packet that is received for the first time, so that the packet analysis device 1 determines that the packet has been received before. When a FIN flag of a TCP header of the ACK A2 corresponds to "OFF", the packet analysis device 1 further determines whether or not the received packet is a DATA. Here, a packet length (Len) of the TCP header in the received packet is 0, so that the packet analysis device 1 determines that the packet is an ACK.

In addition, the packet analysis device 1 adds information that corresponds to the connection ID "0" to the ACK table 116. Here, to the ACK table 116, "2" is set as "Ack.ID" 116*b*, and "7501" is set as "Ack" 116*c*, and "1300" is set as "Time" 116*d* (see FIG. 15C and S108). "Time" 116*d* is an arrival time of the ACK A2.

In addition, the packet analysis device 1 correlates the ACK A2 with a DATA, using the formula (2). Here, an ID of the current ACK is "2", so that "7501" is extracted as "ACK table[2].Ack116*c*" (see FIG. 15C and S108). When "Data.ID" 115*b* of the DATA table 115 is "4", "6001" is extracted as "DATA table[4].Seq115*c*", and "1500" is extracted as "DATA table[4].Len115*d*" (see FIG. 15C and S108). Here, when "Data.ID" is "4", the formula (2) is satisfied, and the ACK A2 and the DATA D4 are associated with each other, so that the packet analysis device 1 performs recording of "4" that is an ID of the DATA that corresponds to "Data.ID" 116*e* of the ACK table 116 (see FIG. 15C and S108).

In addition, an ACK A3 is a third ACK, so that the packet analysis device 1 identifies a DATA/ACK ratio that indicates the number of DATAs for which an ACK is sent back, using the formula (3). Here, an ID of the current ACK A2 is "2". Based on the ACK table 116, an ID of a DATA that corresponds to ACK A2 is "4" (see FIG. 15C and S108). An ID of the previous ACK A1 is "1". Based on the ACK table 116, an ID of a DATA that corresponds to the ACK A1 is "2" (see FIG. 15C and S108). Here, the packet analysis device 1 identifies that an ACK is sent back for two DATAs, using the formula (3). Thus, the DATA/ACK ratio is "2". That is, the number of continuous packets is "2". Therefore, the packet analysis device 1 registers "2" that is the DATA/ACK ratio to "Num.Stream" 113*d* of the status table 113 (see FIG. 15C and S108).

In addition, the packet analysis device 1 determines whether or not the previously-registered DATA/ACK ratio and the currently-registered DATA/ACK ratio are same for "Num.Stream" 113*d* of the status table 113. Here, the previously-registered DATA/ACK ratio is "2", and the currently-registered DATA/ACK ratio is "2", so that the packet analysis device 1 determines that the previously-registered DATA/ACK ratio and the currently-registered DATA/ACK ratio are same. That is, the transmission patterns are same. Therefore, the packet analysis device 1 changes "Status" 113*b* of the status table 113 from "INIT" to "SET_ID" (see FIG. 15C and S108). After that, the processing of S108 ends.

In S109, the packet analysis device 1 receives a DATA D5 that has been transmitted from the terminal 3. In the packet analysis device 1, "Status" 113*b* of the status table 113 is "SET_ID", so that "Now.Data.ID" 113*f* that is an ID of the current DATA is set to "Start.ID" 113*c* (see FIG. 15D and S109). In addition, Similar to S103, the packet analysis device 1 records information on the DATA D5 to the DATA table 115 and the status table 113 (see FIG. 15D and S109). After that, the processing of S109 ends.

In S110, the packet analysis device 1 receives a DATA D6 that has been transmitted from the terminal 3. Similar to S109, the packet analysis device 1 records information on the DATA D6, to the DATA table 115 and the status table 113 (see FIG. 15E and S110). After that, the processing of S110 ends.

In S111, the packet analysis device 1 receives the ACK A3 that has been transmitted from the terminal 4. After that, the packet analysis device 1 determines whether or not a packet having the same connection has been received before, by referring to the connection management table 111. Here, the packet does not correspond to a packet that is received for the first time, so that the packet analysis device 1 determines that the packet has been received before. When a FIN flag of a TCP header of the ACK A3 corresponds to "OFF", the packet analysis device 1 further determines whether or not the received packet is a DATA. Here, a packet length (Len) of the TCP header in the received packet is 0, so that the packet analysis device 1 determines that the packet is an ACK.

In addition, the packet analysis device 1 adds information that corresponds to the connection ID "0", to the ACK table 116. Here, to the ACK table 116, "3" is set as "Ack.ID" 116b, and "10501" is set as "Ack" 116c, and "1800" is set as "Time" 116d (see FIG. 15F and S111). "Time" 116d is an arrival time of the ACK A3.

In addition, the packet analysis device 1 correlates the ACK A3 with a DATA using the formula (2). Here, an ID of the current ACK is "3", so that "10501" is extracted as "ACK table[3].Ack116c" (see FIG. 15F and S111). When "Data.ID" 115b of the DATA table 115 is "6", "9001" is extracted as "DATA table[6].Seq115c", and "1500" is extracted as "DATA table[6].Len115d" (see FIG. 15F and S111). After that, when "Data.ID" is "6", the formula (2) is satisfied, and the ACK A3 and the DATA D6 are associated with each other, so that the packet analysis device 1 performs recording of "6" that is an ID of the corresponding DATA, to "Data.ID" 116e of the ACK table 116 (see FIG. 15F and S111).

In addition, an ACK A4 is a fourth ACK, so that the packet analysis device 1 identifies a DATA/ACK ratio that indicates the number of DATAs for which an ACK is sent back, using the formula (3). Here, similar to S108, the packet analysis device 1 identifies that an ACK is sent back for two DATAs, using the formula (3). Thus, the DATA/ACK ratio is "2". That is, the number of continuous packets is "2". Therefore, the packet analysis device 1 registers "2" that is the DATA/ACK ratio, to "Num.Stream" 113d of the status table 113 (see FIG. 15F and S111).

In addition, the packet analysis device 1 determines whether or not the previously-registered DATA/ACK ratio and the currently-registered DATA/ACK ratio are same for "Num.Stream" 113d of the status table 113. Here, the previously-registered DATA/ACK ratio is "2", and the currently-registered DATA/ACK ratio is "2", so that the packet analysis device 1 determines that the previously-registered DATA/ACK ratio and the currently-registered DATA/ACK ratio are same. That is, it is determined that the transmission patterns are same.

In addition, "Status" 113b of the status table 113 is "SET_ID", so that the packet analysis device 1 determines whether or not the DATA that corresponds to the ACK is a DATA of "Start.ID" 113c of the status table 113 or a subsequent DATA. Here, an ID of the DATA D6 that corresponds to the ACK A3 is "6", and "Start.ID" 113c is "5", so that the packet analysis device 1 determines that the DATA D6 that corresponds to the ACK A4 is a DATA of "Start.ID" 113c or a subsequent DATA. That is, the packet analysis device 1 determines that the DATA D6 that corresponds to the ACK A3 is a DATA after the transmission pattern of continuous packets is stabilized. Therefore, the packet analysis device 1 changes "Status" 113b of the status table 113 from "SET_ID" to "MEASURE" (see FIG. 15F and S111).

In addition, the packet analysis device 1 measures a bandwidth for each of the values of DATA/ACK ratio. Here, the packet analysis device 1 adds a packet length of the DATA D6 that corresponds to the ACK A3, to a packet length that corresponds to "0" of "BW.ID" 114b in the bandwidth analysis table 114 ("Size" 114c). In addition, the packet analysis device 1 adds an arrival time interval between the DATA D6 that corresponds to the ACK A3 and the DATA D5, to an arrival time interval that corresponds to "0" of "BW.ID" 114b in the bandwidth analysis table 114 ("Time.Gap" 114d) (see FIG. 15F, S111, and t1). The packet analysis device 1 adds the packet length of the DATA D5 immediately before the DATA D6, to the packet length that corresponds to "1" of "BW.ID" 114b in the bandwidth analysis table 114 ("Size" 114c). In addition, the packet analysis device 1 adds an arrival time interval between the DATA D5 and the DATA D4, to the arrival time interval that corresponds to "0" of "BW.ID" 114b in the bandwidth analysis table 114 ("Time.Gap" 114d) (see FIG. 15F, S111, and t2). After that, the processing of S111 ends.

After that, similarly, the packet analysis device 1 adds bandwidth data to the bandwidth analysis table 114 as long as the transmission pattern of continuous packets is stabilized. After that, for example, when a FIN flag of a TCP header of the received packet corresponds to "ON", the packet analysis device 1 resets analysis information. At that time, the packet analysis device 1 excludes analysis data that has been affected by the flow control. In addition, the packet analysis device 1 adds the remaining analysis data to the statistical information table 117. The analysis information is reset regardless of the case in which the FIN flag corresponds to "ON". For example, the packet analysis device 1 resets the analysis information even when the RWIN or the DATA/ACK ratio is changed.

Figure 12:
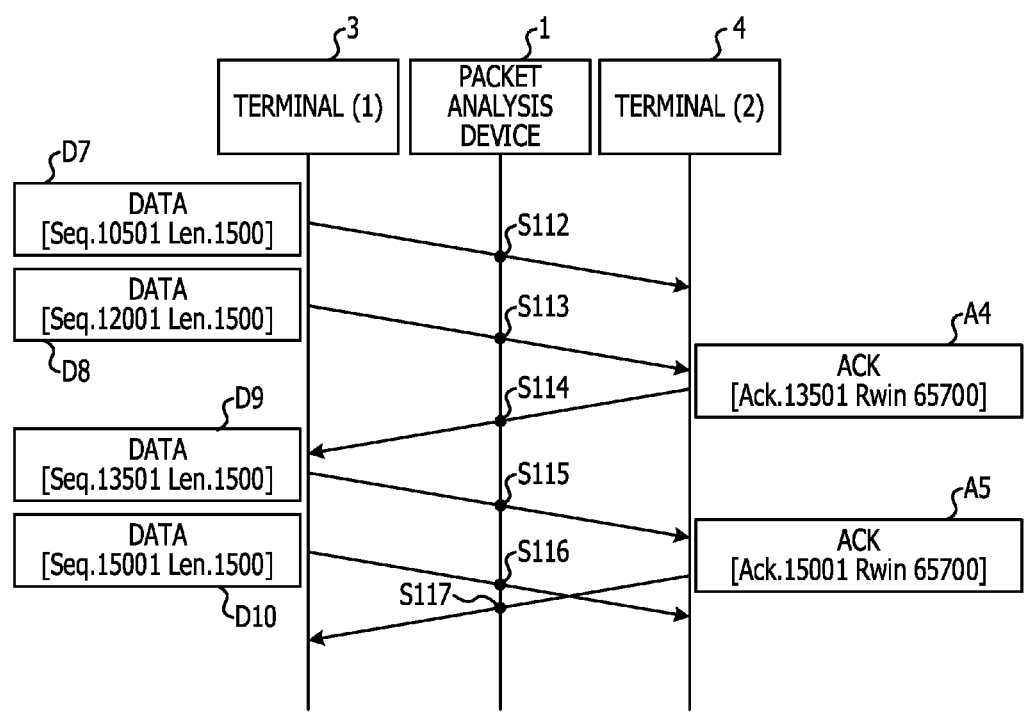
FIG. 12 is a diagram illustrating a sequence of reset processing.

Therefore, a sequence of the processing in which reset is performed when the DATA/ACK ratio is changed is described below with reference to FIG. 12. FIG. 12 is a diagram illustrating the sequence of the reset processing. A description is made below using the various tables in the analysis information table 112 illustrated in FIGS. 16A to 16F. In the sequence, a data packet is referred to as "DATA", and an acknowledge packet is referred to as "ACK". It is assumed that the connection ID is "0".

In S112, the packet analysis device 1 receives a DATA D7 that has been transmitted from the terminal 3. Similar to S109, the packet analysis device 1 records information on the DATA D7 to the DATA table 115 and the status table 113 (see FIG. 16A and S112). After that, the processing of S112 ends.

In S113, the packet analysis device 1 receives a DATA D8 that has been transmitted from the terminal 3. Similar to S110, the packet analysis device 1 records information on the DATA D8 to the DATA table 115 and the status table 113 (see FIG. 16B and S113). After that, the processing of S113 ends.

In S114, the packet analysis device 1 receives an ACK A4 that has been transmitted from the terminal 4. Similar to S111, the packet analysis device 1 records information on the ACK A4 and information on an ID of the DATA D8 that corresponds to the ACK A4, to the ACK table 116 (see FIG. 16C and S114). Similar to S111, the packet analysis device 1 measures a bandwidth for each of the values of DATA/ACK ratio, and records the measured bandwidth to the bandwidth analysis table 114 (see FIG. 16C and S114). After that, the processing of S114 ends.

In S115, the packet analysis device 1 receives a DATA D9 that has been transmitted from the terminal 3. Similar to S109, the packet analysis device 1 records information on the DATA D9, to the DATA table 115 and the status table 113 (see FIG. 16D and S115). After that, the processing of S115 ends.

In S116, the packet analysis device 1 receives a DATA D10 that has been transmitted from the terminal 3. Similar to S110, the packet analysis device 1 records information on the DATA D10, to the DATA table 115 and the status table 113 (see FIG. 16E and S116). After that, the processing of S116 ends.

In S117, the packet analysis device 1 receives an ACK A5 that has been transmitted from the terminal 4. Similar to S111, the packet analysis device 1 identifies a DATA/ACK ratio that indicates the number of DATAs for which an ACK is sent back, using the formula (3). Here, the DATA D9 corresponds to the ACK A5, and the packet analysis device 1 identifies that an ACK is sent back for one DATA, using the formula (3). That is, the DATA/ACK ratio is "1".

In addition, the packet analysis device 1 determines whether or not the previously-registered DATA/ACK ratio and the current DATA/ACK ratio are same for "Num.Stream" 113d of the status table 113. Here, the previously-registered DATA/ACK ratio is "2", and the current DATA/ACK ratio is "1", so that the packet analysis device 1 determines that the previously-registered DATA/ACK ratio and the current DATA/ACK ratio are not same. That is, it is determined that the transmission pattern is changed.

Therefore, the packet analysis device 1 merely adds information on the previous continuous packets to the statistical information table 117, and resets the analysis information table 112. That is, the packet analysis device 1 identifies that analysis data having the narrowest bandwidth is analysis data that corresponds to a packet group that has been affected by the flow control, using the formula (4). Here, when "BW.ID" is "0", "bandwidth analysis table[0].Size/bandwidth analysis table[0].Time.Gap" is "3000/200 (=15)" (see FIG. 16E and the bandwidth analysis table 114). When "BW.ID" is "1", "bandwidth analysis table[1].Size/bandwidth analysis table[1].Time.Gap" is "3000/800 (=3.75)" (see FIG. 16E and the bandwidth analysis table 114). Thus, it is determined that analysis data that corresponds to "BW.ID=1" is analysis data having the narrowest bandwidth, and also is analysis data that corresponds to a packet group that has been affected by the flow control. The packet analysis device 1 removes the analysis data that corresponds to "BW.ID=1", and adds "Size" 114c and "Time.Gap" 114d that are the remaining pieces of analysis data, to the statistical information table 117 (FIG. 16F, see the statistical information table 117).

In addition, the packet analysis device 1 resets the status table 113, the bandwidth analysis table 114, and the ACK table 116. After that, the packet analysis device 1 registers information on the currently received ACK A5, to the ACK table 116 of the analysis information table 112 for which the reset processing is executed, again (see FIG. 16F and the ACK table 116). After that, the processing of S117 ends.

Figure 13:
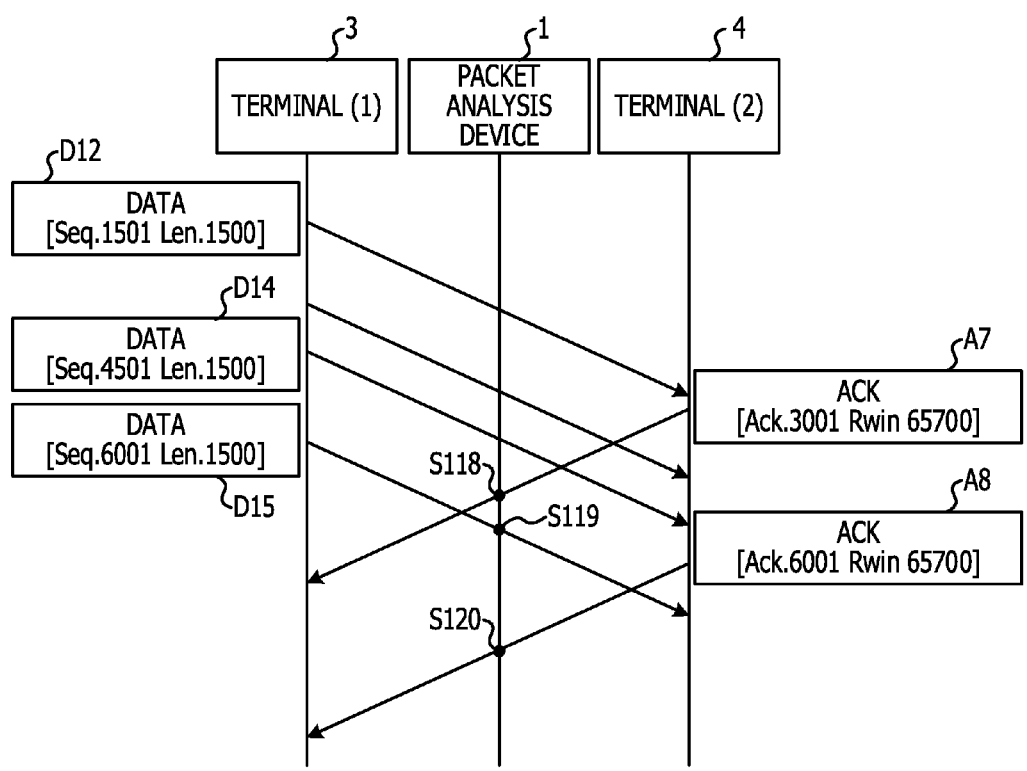
FIG. 13 is a diagram illustrating a sequence of processing when a transmission pattern of continuous packets is not stabilized.
Figure 14A:
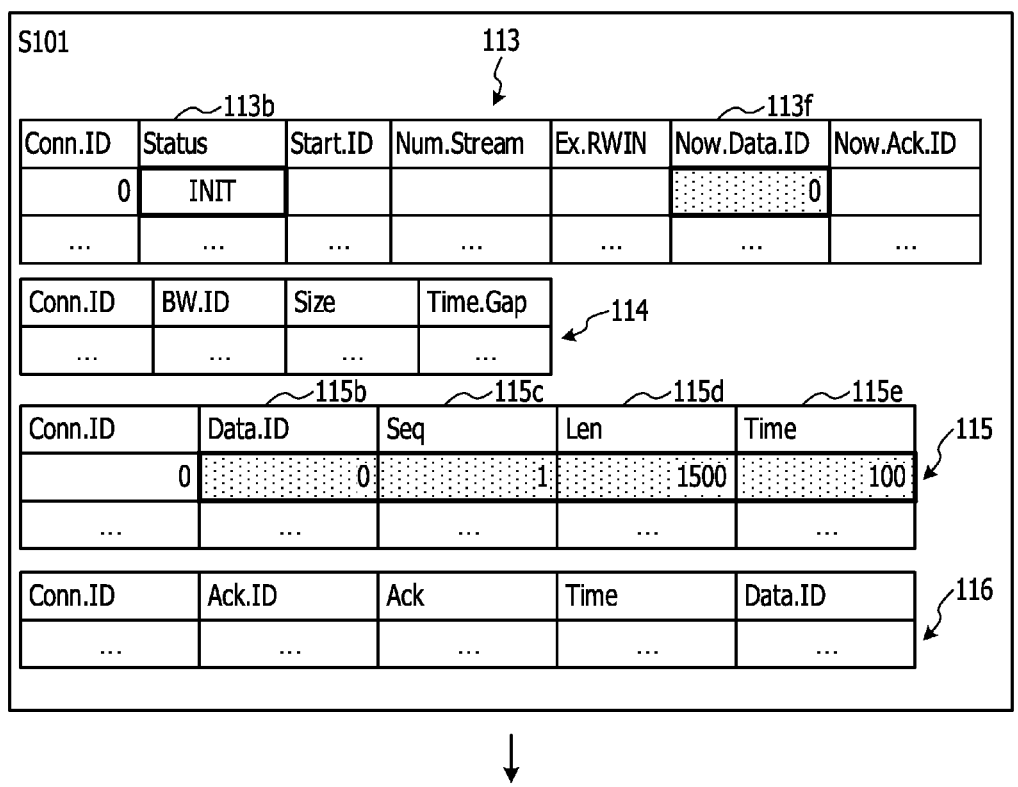
FIG. 14A is a first diagram illustrating transition of tables when the number of continuous packets is identified.
Figure 14B:
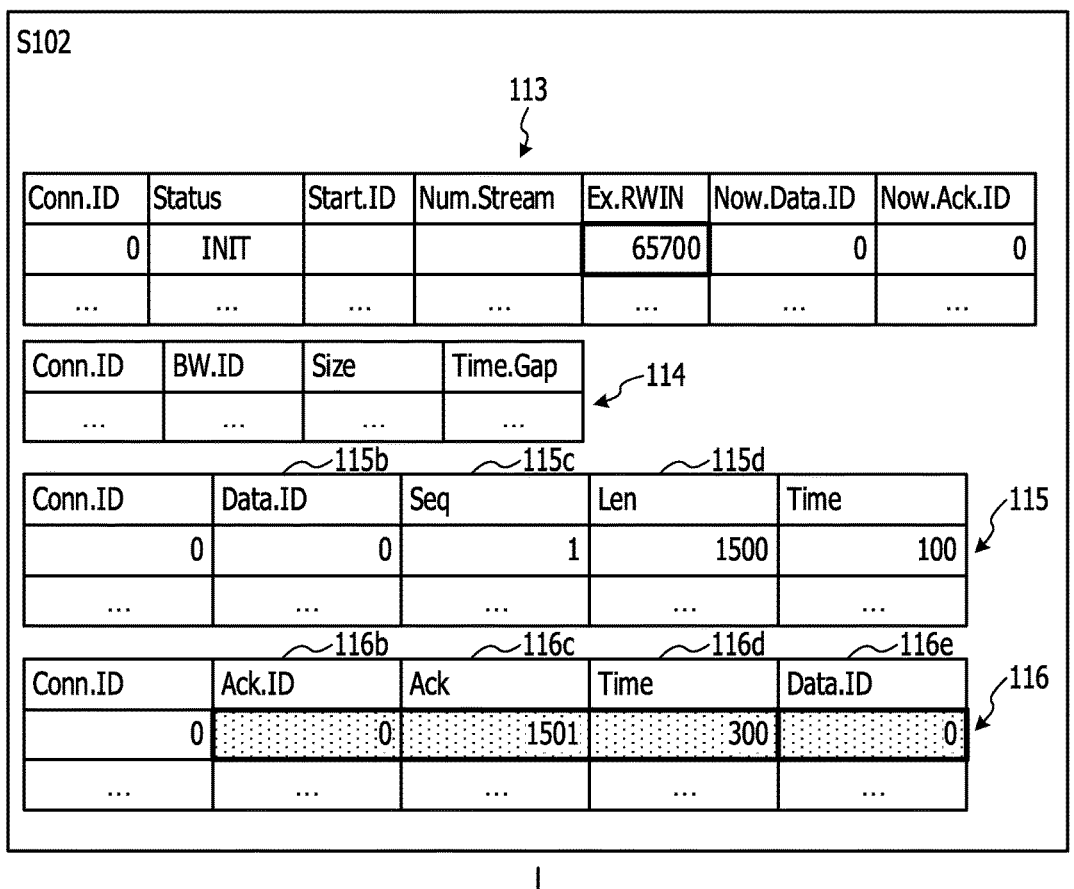
FIG. 14B is a second diagram illustrating the transition of the tables when the number of continuous packets is identified.
Figure 14C:
FIG. 14C is a third diagram illustrating the transition of the tables when the number of continuous packets is identified.
Figure 14D:
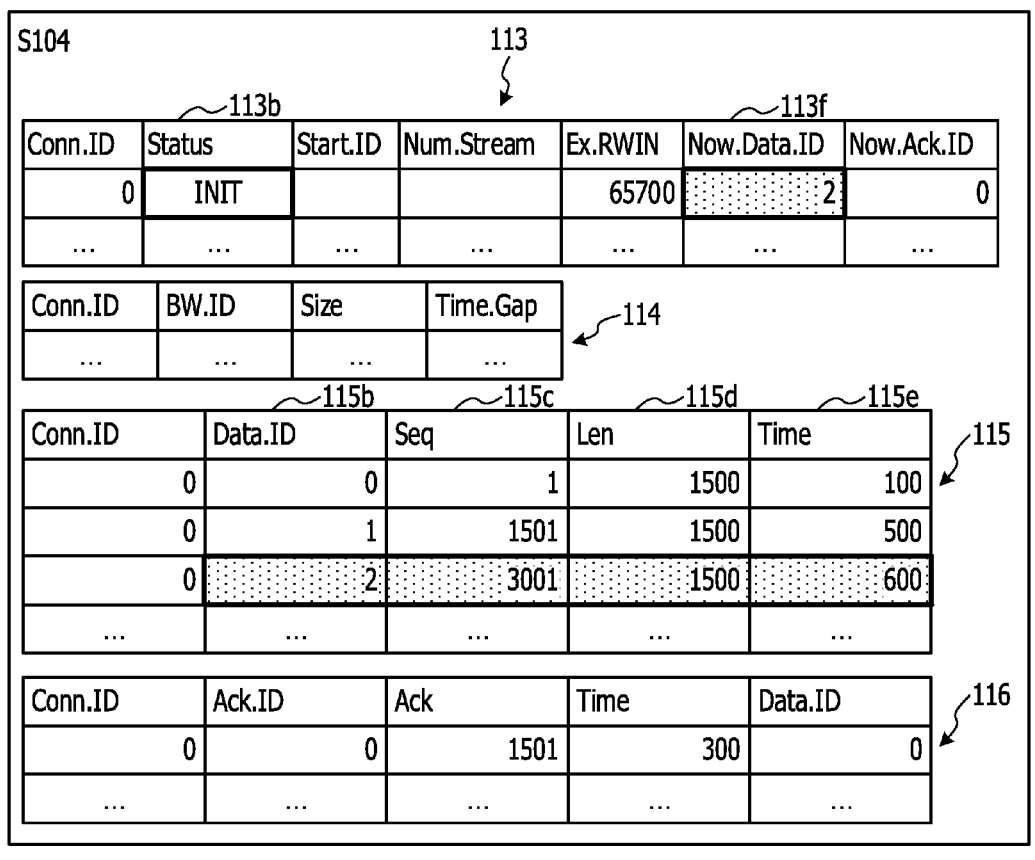
FIG. 14D is a fourth diagram illustrating the transition of the tables when the number of continuous packets is identified.
Figure 15C:
FIG. 15C is a third diagram illustrating the transition of the tables when the continuous packets are identified.
Figure 15D:
FIG. 15D is a fourth diagram illustrating the transition of the tables when the continuous packets are identified.
Figure 15F:
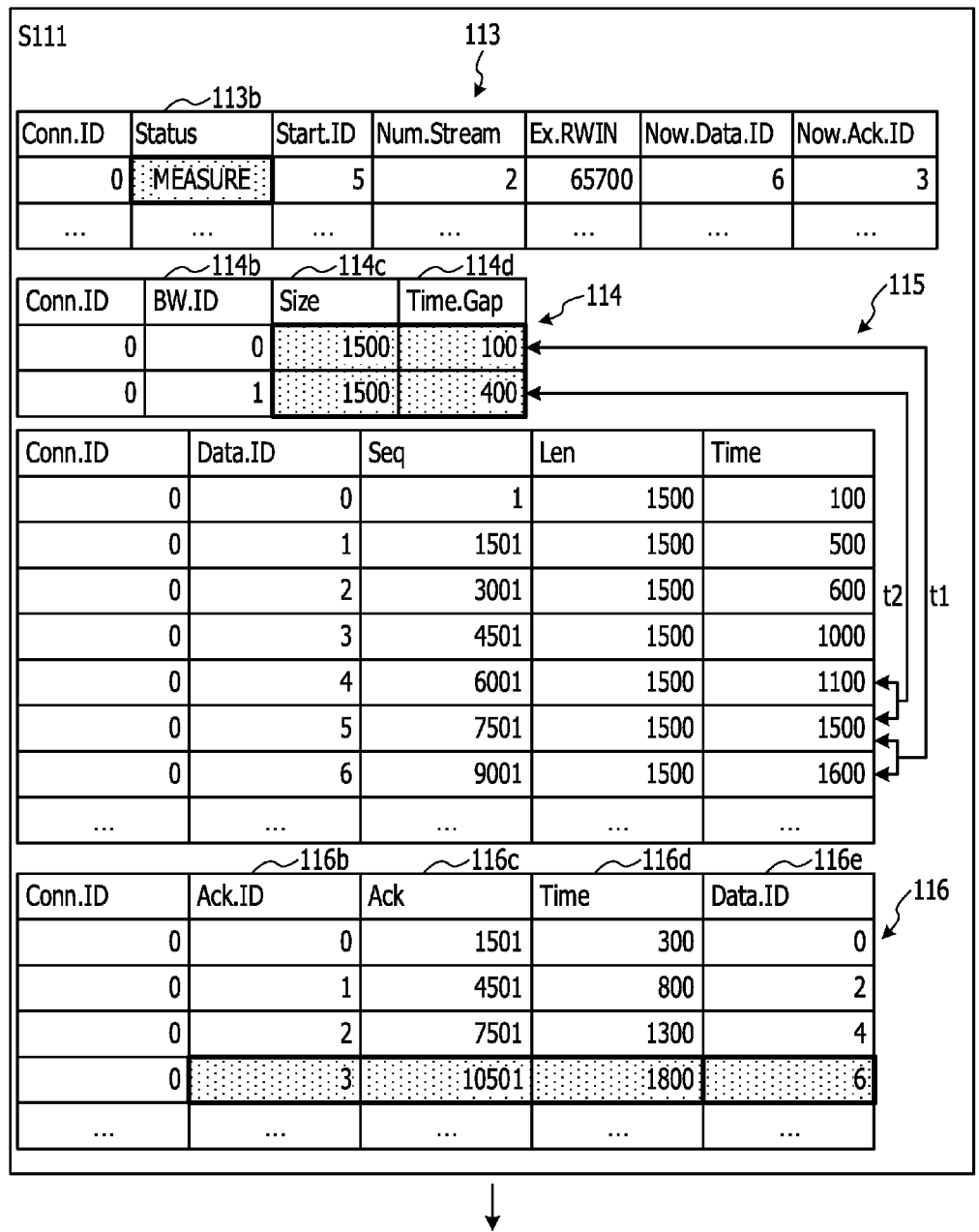
FIG. 15F is a sixth diagram illustrating the transition of the tables when the continuous packets are identified.
Figure 16A:
FIG. 16A is a first diagram illustrating transition of tables when the reset processing is executed.
Figure 16C:
FIG. 16C is a third diagram illustrating the transition of the tables when the reset processing is executed.
Figure 16D:
FIG. 16D is a fourth diagram illustrating the transition of the tables when the reset processing is executed.

A sequence of processing when a transmission pattern of continuous packets is not stabilized is described below with reference to FIG. 13. FIG. 13 is a diagram illustrating the sequence of the processing when a transmission pattern of continuous packets is not stabilized. A description is made below using the various tables in the analysis information table 112 illustrated in FIG. 17A to FIG. 17C. In the sequence, a data packet is referred to as "DATA", and an acknowledge packet is referred to as "ACK". It is assumed that the connection ID is "0".

It is assumed that the DATAs D12 to D14 have been transmitted from the terminal 3.

In S118, the packet analysis device 1 receives an ACK A7 that has been transmitted from the terminal 4. Similar to S111, the packet analysis device 1 records information on the ACK A7 and information on an ID of the DATA D12 that corresponds to the ACK A7, to the ACK table 116 (see FIG. 17A and S118). Similar to S108, the packet analysis device 1 identifies a DATA/ACK ratio. Here, the packet analysis device 1 identifies that an ACK is sent back for two DATAs. Therefore, the packet analysis device 1 registers "2" that is the DATA/ACK ratio, to "Num.Stream" 113d of the status table 113 (see FIG. 17A and S118). In addition, the packet analysis device 1 determines that the previously-registered DATA/ACK ratio and the currently-registered DATA/ACK ratio are same for "Num.Stream" 113d of the status table 113. After that, the packet analysis device 1 changes "Status" 113b of the status table 113 from "INIT" to "SET_ID" (see FIG. 17A and S118). After that, the processing of S118 ends.

In S119, the packet analysis device 1 receives a DATA D15 that has been transmitted from the terminal 3. "Status" 113b of the status table 113 is "SET_ID", so that the packet analysis device 1 sets "Now.Data.ID" 113f that is an ID of the current DATA, to "Start.ID" 113c (see FIG. 17B and S119). In addition, Similar to S109, the packet analysis device 1 records information on the DATA D15, to the DATA table 115 and the status table 113 (see FIG. 17B and S119). After that, the processing of S119 ends.

In S120, the packet analysis device 1 receives an ACK A8 that has been transmitted from the terminal 4. Similar to S110, the packet analysis device 1 records information on the ACK A8 and information on an ID of the DATA D14 that corresponds to the ACK A8, to the ACK table 116 (see FIG. 17C and S120). Similar to S111, the packet analysis device 1 identifies a DATA/ACK ratio. Here, the packet analysis device 1 identifies that an ACK is sent back for two DATAs. Therefore, the packet analysis device 1 registers "2" that is the DATA/ACK ratio, to "Num.Stream" 113d of the status table 113 (see FIG. 17C and S120). In addition, the packet analysis device 1 determines that the previously-registered DATA/ACK ratio and the currently-registered DATA/ACK ratio are same for "Num.Stream" 113d of the status table 113.

In addition, "Status" 113b of the status table 113 is "SET_ID", so that the packet analysis device 1 determines whether or not the DATA that corresponds to the ACK is a DATA of "Start.ID" 113c of the status table 113 or a subsequent DATA. Here, an ID of the DATA D14 that corresponds to ACK A8 is "14", and "Start.ID" 113c is "15", so that the packet analysis device 1 determines that the DATA D14 that corresponds to the ACK A8 is not a DATA of "Start.ID" 113c or a subsequent DATA. That is, the packet analysis device 1 determines that the DATA D14 that corresponds to the ACK A8 is not a DATA after a transmission pattern of continuous packets is stabilized. Therefore, the packet analysis device 1 does not do anything, and the processing of S120 ends.

Figure 18A:
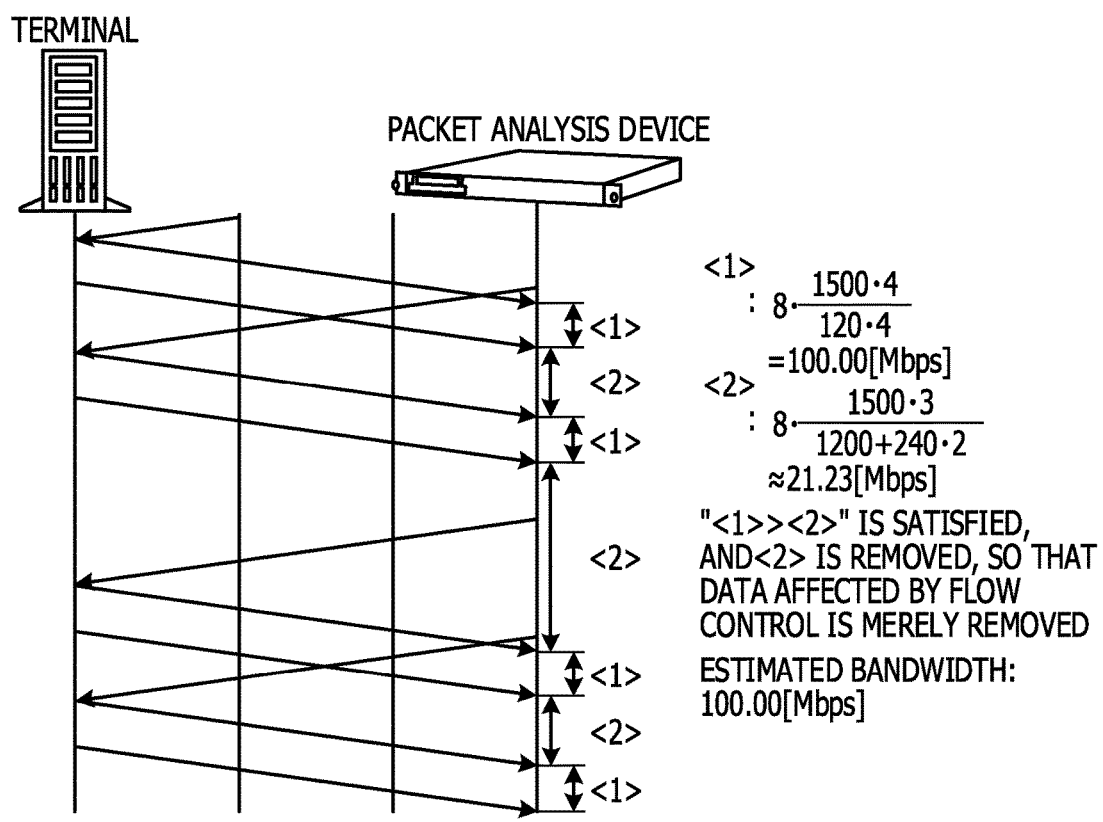
FIG. 18A is a diagram illustrating an example of bandwidth measurement of the packet analysis processing according to the embodiment.

An example of bandwidth measurement of the packet analysis processing according to the embodiment is described below with reference to FIG. 18A. FIG. 18A is an example of the bandwidth measurement of the packet analysis processing according to the embodiment. It is assumed that the number of continuous packets that is identified by the continuous packet extraction unit 124 is two. Each of <1> corresponds to analysis data that is added to "Size" 114c and "Time.Gap" 114d that correspond to "0" of "BW.ID" 114b in the bandwidth analysis table 114. Each of <2> corresponds to analysis data that is added to "Size" 114c and "Time.Gap" 114d that correspond to "1" of "BW.ID" 114b in the bandwidth analysis table 114.

As illustrated in FIG. 18A, the packet analysis device 1 combines packet lengths of DATAs and combines arrival time intervals between packets, for <1>. Here, when it is assumed that the packet length of the DATA is 1500, a total of the packet lengths is "1500×4". When it is assumed that the arrival time interval between DATAs of <1> is 120, a total of the arrival time intervals between the packets is "120×4". Thus, a bandwidth of <1> is represented by the following formula (5).

$$\text{Bandwidth of <1>} = 8 \times (1500 \times 4)/(120 \times 4) = 100.00 \text{ [Mbps]} \quad \text{formula (5)}$$

The packet analysis device 1 combines packet lengths of DATAs and combines arrival time intervals between packets, for <2>. Here, when it is assumed that the packet length of the DATA is 1500, a total of the packet lengths is "1500×3". When it is assumed that the arrival time intervals between DATAs of <2> are 240, 1200, and 240, a total of the arrival time intervals between the packets is "1200+240×2". Thus, a bandwidth of <2> is represented by the following formula (6).

$$\text{Bandwidth of <2>} = 8 \times (1500 \times 3)/(1200 + 240 \times 2) = 21.23 \text{ [Mbps]} \quad \text{formula (6)}$$

Thus, the packet analysis device 1 determines that analysis data having the narrowest bandwidth is analysis data that corresponds to a packet group that has been affected by the flow control, and performs filtering on the analysis data. Here, the packet analysis device 1 removes <2>. In addition, the packet analysis device 1 estimates the bandwidth of remaining <1> as a bandwidth of a network. That is, the estimated bandwidth is 100.00 [Mbps].

Figure 18B:
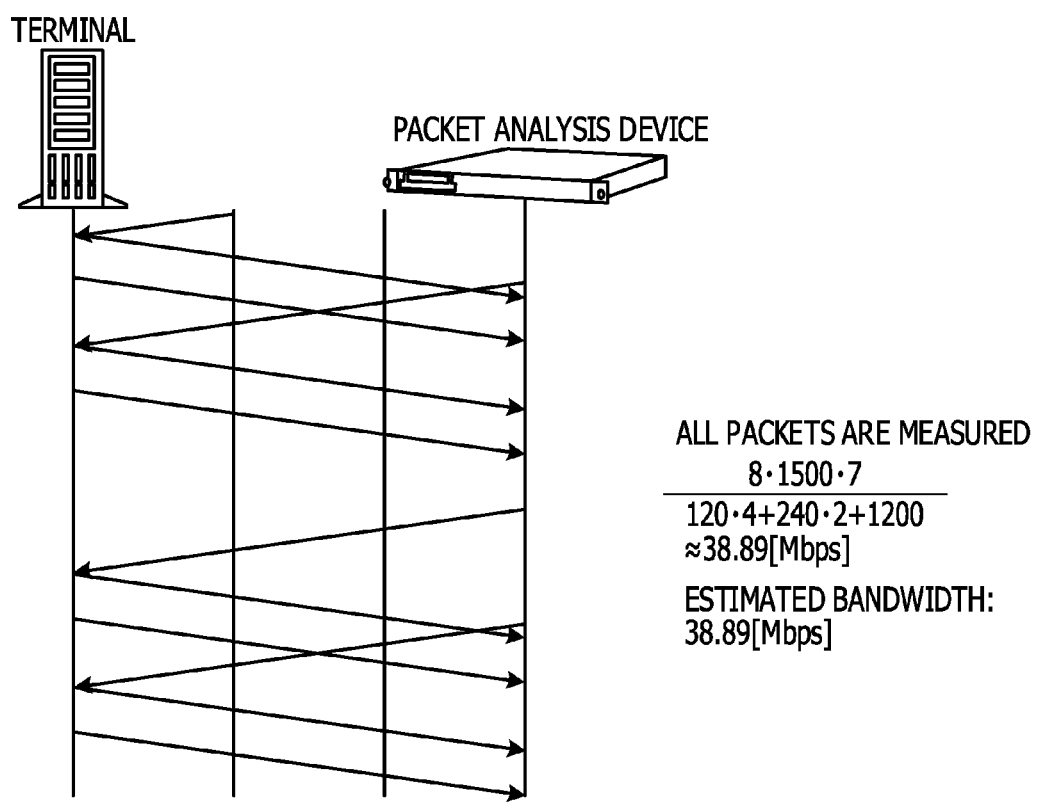
FIG. 18B is a diagram illustrating an example of bandwidth measurement in a related art.

FIG. 18B is a diagram illustrating an example of bandwidth measurement in the related art. As illustrated in FIG. 18B, the bandwidth is measured using all DATAs. The bandwidth is represented by the following formula (7).

$$\text{Bandwidth} = 8 \times (1500 \times 7)/(120 \times 4 + 240 \times 2 + 1200) = 38.89 \text{ [Mbps]} \quad \text{formula (7)}$$

That is, the estimated bandwidth is 38.39 [Mbps].

The packet analysis device 1 removes a packet group that has been affected by the flow control, and estimates a bandwidth using the remaining packet group. Therefore, the method achieves measurement of an accurate bandwidth as compared with the method of performing measurement using all packets.

Figure 19A:
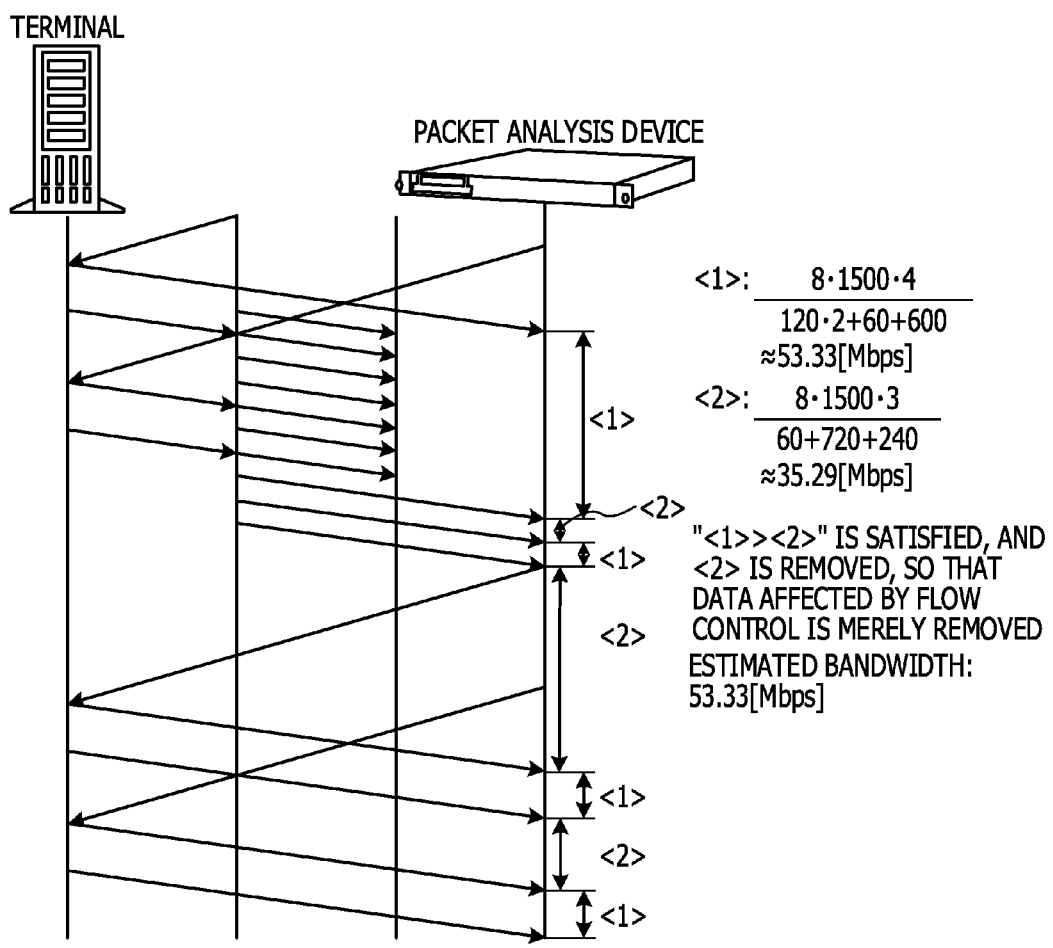
FIG. 19A is a diagram illustrating a further example of bandwidth measurement of the packet analysis processing according to the embodiment.

A further example of bandwidth measurement of the packet analysis processing according to the embodiment is described below with reference to FIG. 19A. FIG. 19A is the further example of the bandwidth measurement of the packet analysis processing according to the embodiment. In FIG. 19A, an example of bandwidth measurement when cross traffic occurs is illustrated. The cross traffic is further traffic in which a packet flows through the network. It is assumed that the number of continuous packets that is identified by the continuous packet extraction unit 124 is two. It is assumed that each <1> corresponds to analysis data that is added to "Size" 114c and "Time.Gap" 114d that correspond to "0" of "BW.ID" 114b in the bandwidth analysis table 114. It is assumed that each <2> corresponds to analysis data that is added to "Size" 114c and "Time.Gap" 114d that correspond to "1" of "BW.ID" 114b in the bandwidth analysis table 114.

As illustrated in FIG. 19A, the packet analysis device 1 combines packet lengths of DATAs and combines arrival time intervals between packets, for <1>. Here, when it is assumed that the packet length of the DATA is 1500, a total of the packet lengths is "1500×4". When it is assumed that arrival time intervals between the DATAs of <1> are 600, 60, 120, and 120, a total of the arrival time intervals between the packets is "120×2+60+600". Thus, a bandwidth of <1> is represented by the following formula (8).

$$\text{Bandwidth of <1>} = 8 \times (1500 \times 4)/(120 \times 2 + 60 + 600) = 53.33 \text{ [Mbps]} \quad \text{formula (8)}$$

The packet analysis device 1 combines packet lengths of DATAs and combines arrival time intervals between packets for <2>. Here, when it is assumed that the packet length of the DATA is 1500, a total of the packet lengths is "1500×3". When it is assumed that the arrival time intervals between the DATAs of <2> are 60, 720, and 240, a total of the arrival time intervals between the packet is "60+720+240". Thus, a bandwidth of <2> is represented by the following formula (9).

$$\text{Bandwidth of <2>} = 8 \times (1500 \times 3)/(60 + 720 + 240) = 35.29 \text{ [Mbps]} \quad \text{formula (9)}$$

Thus, the packet analysis device 1 determines that analysis data having the narrowest bandwidth is analysis data that corresponds to a packet group that has been affected by the flow control and performs filtering on the analysis data. Here, the packet analysis device 1 removes <2>. In addition, the packet analysis device 1 estimates the bandwidth of remaining <1> as a bandwidth of a network. That is, the estimated bandwidth is 53.33 [Mbps].

Figure 19B:
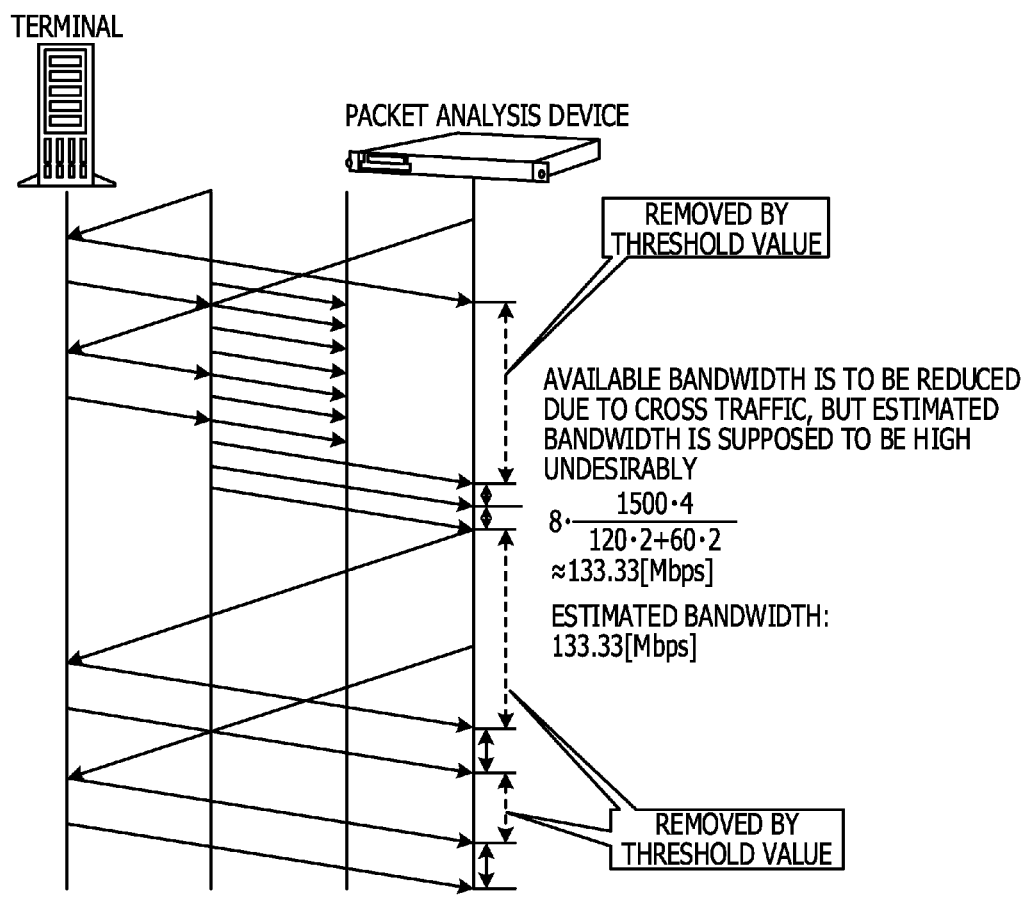
FIG. 19B is a diagram illustrating a further example of bandwidth measurement in the related art.

FIG. 19B is a diagram illustrating a further example of the bandwidth measurement in the related art. As illustrated in FIG. 19B, a bandwidth is measured using all DATAs that are obtained by removing a portion that corresponds to cross traffic and the like using a threshold value. The bandwidth is represented by the following formula (10).

$$\text{Bandwidth} = 8 \times (1500 \times 4)/(120 \times 2 + 60 \times 2) = 133.33 \text{ [Mbps]} \quad \text{formula (10)}$$

That is, the estimated bandwidth is 133.33 [Mbps]. Originally, an available bandwidth is to be narrowed when cross traffic occurs, but the estimated bandwidth is supposed to be increased.

The packet analysis device 1 removes a packet group that has been affected by the flow control, and estimates a bandwidth using the remaining packet group. Therefore, the method may measure an accurate bandwidth as compared with the method of performing measurement using all packets that are removed using the threshold value.

In the above-described embodiment, the packet analysis device 1 obtains a packet that is communicated between the terminal 3 and the terminal 4 at one of points of the networks between the terminal 3 and the terminal 4. In addition, based on an interval between obtaining timings of a plurality of data packets that is transmitted from the terminal 3 to the terminal 4 and obtained during a period from obtaining of a first ACK that has been transmitted from the terminal 4 to the terminal 3 to obtaining of a second ACK that is an ACK that is transmitted after the first ACK, and an interval between obtaining timings of data packets that are adjacent to each other, the packet analysis device 1 identifies a data packet by which a large interval is generated from among the intervals between the obtaining timings. In such a structure, the packet analysis device 1 may identify a data packet that has been affected by the flow control by identifying a data packet by which a large interval is generated from among the intervals between the obtaining timings of data packets. That is, the packet analysis device 1 may identify a data packet that is improper for measurement of a bandwidth. In addition, the packet analysis device 1 may measure an accurate bandwidth by removing the identified improper data packet.

In the above-described embodiment, the packet analysis device 1 identifies the number of continuous data packets based on a difference between an identification number of a DATA that corresponds to a first ACK and an identification number of a DATA that corresponds to a second ACK. In addition, the packet analysis device 1 identifies a data packet by which a larger interval is generated from among intervals between obtaining timings that corresponds to the identified number of data packets. In such a structure, the packet analysis device 1 may identify continuous data packets even when there is a deviation between transmission timing of the terminal and reception timing at the observation point.

In the above-described embodiment, when the communication between the terminal 3 and the terminal 4 is changed in the middle, the packet analysis device 1 resets obtaining timings of a plurality of data packets that has been already obtained and an interval between the obtaining timings. In such a structure, the packet analysis device 1 may remove information when the communication is changed in the middle, from measurement of a bandwidth, by resetting the information, and may avoid that a data packet that has been affected by the flow control is identified by mistake.

In the embodiment, the bandwidth estimation unit 125 estimates a bandwidth in the case in which the number of continuous packets is two. However, a case may be employed in which in the bandwidth estimation unit 125, the number of continuous packets is three, or four or more. In such a case, the bandwidth estimation unit 125 measures a bandwidth for each of the numbers of continuous packets, and holds the measured bandwidth in the bandwidth analysis table 114 as analysis data. In addition, the bandwidth estimation unit 125 performs filtering on analysis data having the narrowest bandwidth from among the separately measured bandwidths, as analysis data that has been affected by the flow control. In addition, the bandwidth estimation unit 125 adds the remaining plurality pieces of analysis data after the filtering, to the statistical information table 117. After that, the bandwidth estimation unit 125 may estimate a network bandwidth using a packet length and an arrival time interval between the packets, which are obtained as the result of the addition.

The packet analysis device 1 may be obtained by installing functions of the above-described connection management unit 123, continuous packet extraction unit 124, and bandwidth estimation unit 125, on an information processing device such as a known personal computer and a workstation.

The structural elements of the device may not physically limited to the illustrated structure. That is, a specific embodiment of distribution and integration of the device is not limited to those illustrated, and all or a part of those illustrated may be configured so as to be distributed or integrated functionally or physically in a given unit depending on the status of use and various loads. For example, the communication interface 122 and the connection management unit 123 may be integrated as a single unit. On the other hand, the bandwidth estimation unit 125 may be divided into a measuring unit that measures a bandwidth for each of the numbers of continuous packets, and an effect identification unit that identifies a bandwidth that has been affected by the flow control from among the separately measured bandwidths. The connection management table 111, the analysis information table 112, and the statistical information table 117 may be connected to the packet analysis device 1 through a network as external devices of the packet analysis device 1.

Figure 20:
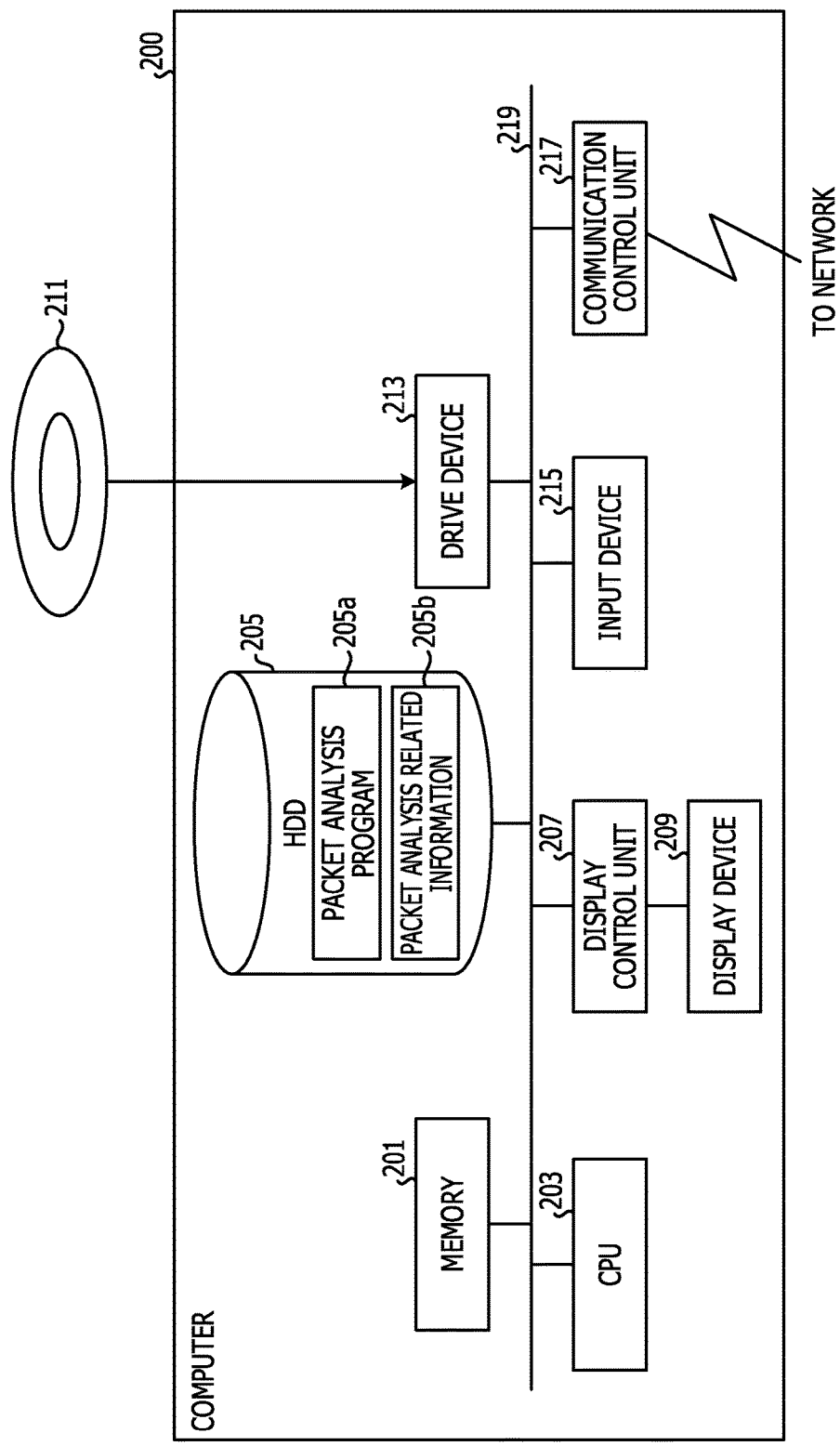
FIG. 20 is a diagram illustrating an example of a computer that executes a packet analysis program.
Figure 21:
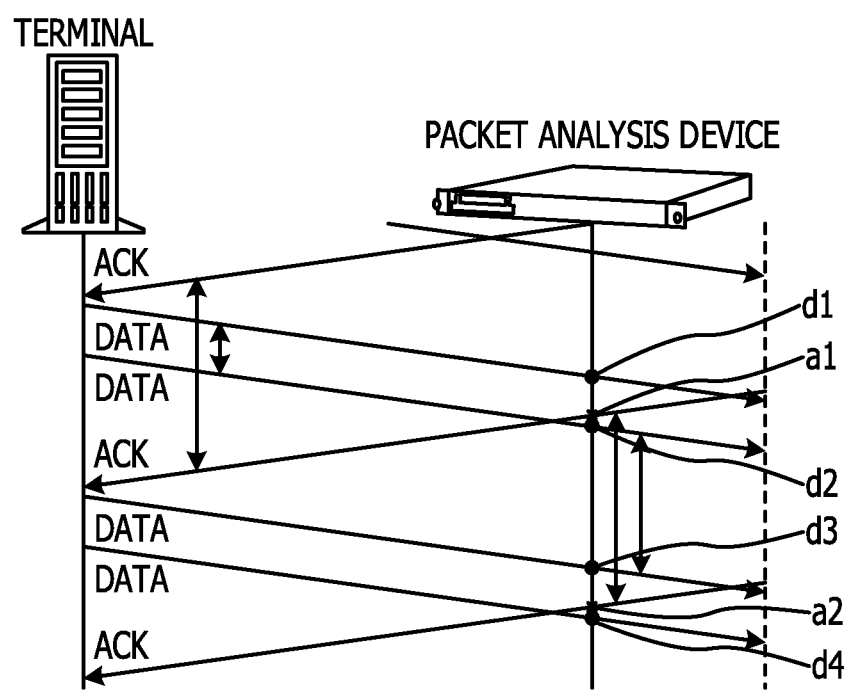
FIG. 21 is a diagram illustrating deviation between transmission timing of the terminal and reception timing of the observation point.

The various pieces of processing that are described in the above-described embodiment may be achieved by executing a program that has been prepared beforehand on a computer such as a personal computer and a workstation. Therefore, an example of a computer that executes a packet analysis program that obtains a function that is similar to the packet analysis device 1 illustrated in FIG. 1 is described below. FIG. 20 is a diagram illustrating the example of the computer that executes the packet analysis program.

As illustrated in FIG. 20, a computer 200 includes a central processing unit (CPU) 203 that executes various pieces of calculation processing, an input device 215 that accepts an input of data from a user, and a display control unit 207 that controls a display device 209. The computer 200 includes a drive device 213 that reads a program and the like from a storage medium, and a communication control unit 217 that transmits and receives data to and from a further computer through a network. The computer 200 includes a memory 201 that temporarily stores various pieces of information and a hard disk drive (HDD) 205. In addition, the memory 201, the CPU 203, the HDD 205, the display control unit 207, the drive device 213, the input device 215, and the communication control unit 217 are connected to each other through a bus 219.

The drive device 213 is, for example, a device for a removable disk 211. The HDD 205 stores a packet analysis program 205*a* and packet analysis related information 205*b*.

The CPU 203 reads the packet analysis program 205*a*, deploys the packet analysis program 205*a* to the memory 201, and executes the packet analysis program 205*a* as a process. Such a process corresponds to each of the function units of the packet analysis device 1. The packet analysis related information 205*b* corresponds to the connection management table 111, the analysis information table 112, and the statistical information table 117. In addition, for example, the removable disk 211 stores information such as the packet analysis program 205*a*.

The packet analysis program 205*a* may not be stored in the HDD 205 from the beginning. For example, a portable physical medium that is inserted into the computer 200 such as a flexible disk (FD), a compact disc-read-only memory (CD-ROM), a digital versatile disc (DVD) disk, a magneto optical disk, and an integrated circuit (IC) card is caused to store the program. In addition, the computer 200 may read the packet analysis program 205*a* from the portable physical medium and execute the packet analysis program 205*a*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet analysis method executed by a packet analysis device that analyzes a packet communicated between a first device and a second device on a network, the packet analysis method comprising:

receiving, by a communication interface device included in the packet analysis device and coupled to the network, a first acknowledge packet transmitted from the first device and a second acknowledge packet transmitted from the first device after the first acknowledge packet;

receiving, by the communication interface device, a plurality of packets transmitted from the second device during a period from reception of the first acknowledge packet by the communication interface device to reception of the second acknowledge packet by the communication interface device, the plurality of packets being respectively different from an acknowledge packet;

identifying, by at least one processor included in the packet analysis device, a number of packets corresponding to data transmitted from the second device to the first device among the plurality of packets, by calculating a difference between a first identification number corresponding to the first acknowledge packet and a second identification number corresponding to the second acknowledge packet;

storing information on acquisition timings that indicate timings at which the plurality of packets are respectively acquired, the acquisition timings being acquired by the packet analysis device, and information on an interval between the acquisition timings of two adjacent packets from among the plurality of packets in a memory;

calculating a ratio of a number of the data packets to the acknowledge packet for each certain timing;

deleting the information on the acquisition timings and the information on the interval that are stored in the memory when the ratio is changed;

calculating, by the at least one processor a plurality of bandwidth values, a number of the plurality of bandwidth values being identical to the number of packets corresponding to the data, based on the acquisition timings and the interval between the acquisition timings of two adjacent packets from among the plurality of packets;

specifying, by the at least one processor, a bandwidth value that is to be removed from the plurality of bandwidth values by comparing the plurality of bandwidth values with each other, and diagnosing, by the at least one processor, analysis data generated by removing the specified bandwidth value from the plurality of bandwidth values.

2. The packet analysis method according to claim 1, wherein the calculating includes calculating the plurality of bandwidth values by dividing a size of each of the plurality of packets by the interval of the packets having the size.

3. The packet analysis method according to claim 1, wherein the calculating includes calculating the plurality of bandwidth values by classifying the plurality of bandwidth values into groups, a number of the groups is identical to the number of packets corresponding to the data, and calculating an average for each of the groups.

4. The packet analysis method according to claim 3, wherein the determining includes determining a smallest bandwidth value from among the plurality of bandwidth values as the bandwidth value that is to be removed.

5. The packet analysis method according to claim 1, wherein the acquiring of the first acknowledge packet and the second acknowledge packet includes:

receiving a first target packet from the first device; and
determining the received first target packet as the first acknowledge packet or the second acknowledge packet when information on a packet length that is included in the first target packet indicates zero.

6. The packet analysis method according to claim 5, wherein the acquiring of the plurality of packets includes:
receiving a second target packet from the second device; and determining the received second target packet as a data packet when information on the packet length that is included in the second target packet indicates a value that is more than zero.

7. The packet analysis method according to claim 1, further comprising:

measuring a network bandwidth between the first device and the second device using remaining information acquired by removing information on the bandwidth value that is to be removed, from the information on the plurality of bandwidth values.

8. A packet analysis device that analyzes a packet communicated between a first device and a second device on a network, the packet analysis device comprising:

a communication interface device coupled to the network and configured to:

receive a first acknowledge packet transmitted from the first device and a second acknowledge packet transmitted from the first device after the first acknowledge packet;

receive a plurality of packets transmitted from the second device during a period from reception of the first acknowledge packet by the packet analysis device to reception of the second acknowledge packet by the packet analysis device, the plurality of packets being respectively different from an acknowledge packet; and at least one processor coupled to the communication interface device and configured to:

identify a number of packets corresponding to data transmitted from the second device to the first device among the plurality of packets, by calculating a difference between a first identification number corresponding to the first acknowledge packet and a second identification number corresponding to the second acknowledge packet;

store information on acquisition timings that indicate timings at which the plurality of packets are respectively acquired, the acquisition timings being acquired by the packet analysis device, and information on an interval between the acquisition timings of two adjacent packets from among the plurality of packets in a memory;

calculate a ratio of a number of the data packets to the acknowledge packet for each certain timing;

delete the information on the acquisition timings and the information on the interval that are stored in the memory when the ratio is changed;

calculate a plurality of bandwidth values, a number of the plurality of bandwidth values being identical to the number of packets corresponding to the data, based on the acquisition timings and the interval between the acquisition timings of two adjacent packets from among the plurality of packets;

specify a bandwidth value that is to be removed from the plurality of bandwidth values by comparing the plurality of bandwidth values with each other; and diagnose analysis data generated by removing the specified bandwidth value from the plurality of bandwidth values.

9. The packet analysis device according to claim 8, wherein the at least one processor is further configured to calculate the plurality of bandwidth values by dividing a size of each of the plurality of packets by the interval of the packets having the size.

10. The packet analysis device according to claim 8, wherein the at least one processor is further configured to:
calculate the plurality of bandwidth values by classifying the plurality of bandwidth
values into groups, a number of the groups is identical to the number of packets corresponding to the data; and
calculate an average for each of the groups.

11. The packet analysis device according to claim 10, wherein the at least one processor is further configured to determine a smallest bandwidth value from among the plurality of bandwidth values as the bandwidth value that is to be removed.

12. The packet analysis device according to claim 9, wherein the communication interface device is further configured to receive a first target packet from the first device, and
wherein the at least one processor is further configured to determine the received first target packet as the first acknowledge packet or the second acknowledge packet when information on a packet length that is included in the first target packet indicates zero.

13. A non-transitory computer-readable storage medium storing a program that analyzes a packet communicated between a first device and a second device on a network, the program causing a computer to execute a process, the process comprising:
receiving, by a communication interface device included in the computer and coupled to the network, a first acknowledge packet transmitted from the first device and a second acknowledge packet transmitted from the first device after the first acknowledge packet;
receiving, by the communication interface device, a plurality of packets transmitted from the second device during a period from reception of the first acknowledge packet, by a packet analysis device included in the computer, to reception of the second acknowledge packet by the packet analysis device, the plurality of packets being respectively different from an acknowledge packet;
identifying, by at least one processor included in the computer, a number of packets corresponds to data transmitted from the second device to the first device among the plurality of packets, by calculating a difference between a first identification number corresponding to the first acknowledge packet and a second identification number corresponding to the second acknowledge packet;
storing information on acquisition timings that indicate timings at which the plurality of packets are respectively acquired, the acquisition timings being acquired by the packet analysis device, and information on an interval between the acquisition timings of two adjacent packets from among the plurality of packets in a memory;
calculating a ratio of a number of the data packets to the acknowledge packet for each certain timing;
deleting the information on the acquisition timings and the information on the interval that are stored in the memory when the ratio is changed;
calculating, by the at least one processor, a plurality of bandwidth values, a number of the plurality of bandwidth values being identical to the number of packets, based on the acquisition timings and the interval between the acquisition timings of two adjacent packets from among the plurality of packets;
determining, by the at least one processor, a bandwidth value that is to be removed from the plurality of bandwidth values by comparing the plurality of bandwidth values with each other; and
diagnosing, by the at least one processor, analysis data generated by removing the specified bandwidth value from the plurality of bandwidth values.

14. The storage medium according to claim 13, wherein the calculating includes calculating the plurality of bandwidth values by dividing a size of each of the plurality of packets by the interval of the packets having the size.

15. The storage medium according to claim 13, wherein the calculating includes calculating the plurality of bandwidth values by
classifying the plurality of bandwidth values into groups, a number of the groups is identical to the number of packets corresponding to the data, and calculating an average for each of the groups.

16. The storage medium according to claim 15, wherein the determining includes determining a smallest bandwidth value from among the plurality of bandwidth values as the bandwidth value that is to be removed.

17. The storage medium according to claim 13, wherein the acquiring of the first acknowledge packet and the second acknowledge packet includes:
receiving a first target packet from the first device; and
determining the received first target packet as the first acknowledge packet or the second acknowledge packet when information on a packet length that is included in the first target packet indicates zero.

18. The storage medium according to claim 17, wherein the acquiring of the plurality of packets includes:
receiving a second target packet from the second device; and
determining the received second target packet as a data packet when information on the packet length that is included in the second target packet indicates a value that is more than zero.

19. The storage medium according to claim 13, wherein the process further comprising:
measuring a network bandwidth between the first device and the second device using remaining information acquired by removing information on the bandwidth value that is to be removed, from the information on the plurality of bandwidth values.

* * * * *